(12) United States Patent
Fujita

(10) Patent No.: US 10,147,462 B2
(45) Date of Patent: Dec. 4, 2018

(54) FOOTAGE COLLECTING/BROADCASTING DEVICE, FOOTAGE COLLECTING/BROADCASTING SYSTEM, FOOTAGE COLLECTING/BROADCASTING METHOD, AND RECORDING MEDIUM RECORDED WITH A PROGRAM

(71) Applicant: FUJITSU LIMITED, Kawasaki-shi, Kanagawa (JP)

(72) Inventor: Shin Fujita, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/079,893

(22) Filed: Mar. 24, 2016

(65) Prior Publication Data

US 2016/0203844 A1 Jul. 14, 2016

Related U.S. Application Data

(63) Continuation of application No. PCT/JP2013/076613, filed on Sep. 30, 2013.

(51) Int. Cl.
*G11B 27/36* (2006.01)
*G11B 27/10* (2006.01)
(Continued)

(52) U.S. Cl.
CPC ............ *G11B 27/36* (2013.01); *G11B 27/10* (2013.01); *H04N 5/77* (2013.01); *H04N 9/8211* (2013.01);
(Continued)

(58) Field of Classification Search
CPC .. H04N 21/231; H04N 21/24; H04N 21/2404; H04N 21/2747; H04N 21/4335;
(Continued)

(56) References Cited

U.S. PATENT DOCUMENTS 5,986,695 A * 11/1999 Choi ................... H04N 7/188
348/143
7,526,787 B1 4/2009 Williamson et al.
(Continued)

FOREIGN PATENT DOCUMENTS

JP H09-074554 A 3/1997
JP H10-104738 A 4/1998
(Continued)

OTHER PUBLICATIONS

International Search Report, dated Jun. 24, 2014 in connection with PCT/JP2013/076613 (4 pages).
(Continued)

*Primary Examiner* — Thai Q Tran
*Assistant Examiner* — Stephen R Smith
(74) *Attorney, Agent, or Firm* — Fujitsu Patent Center

(57) ABSTRACT

A footage collecting/broadcasting device includes a procedure, the procedure including: cyclically overwriting and storing input footage data in a storage section; periodically transmitting an existence confirmation request to an external device; setting, as a first start time to start protection of the footage data that excludes the inputted footage data from an overwrite target, a point in time reached by backtracking by a set time in cases in which the existence confirmation response from the external device is not detected a specific number of times.

16 Claims, 22 Drawing Sheets

(51) Int. Cl.
| | |
|---|---|
| *H04N 17/06* | (2006.01) |
| *H04N 21/231* | (2011.01) |
| *H04N 21/24* | (2011.01) |
| *H04N 5/77* | (2006.01) |
| *H04N 9/82* | (2006.01) |
| *H04N 21/4335* | (2011.01) |
| *H04N 21/2747* | (2011.01) |
| *H04N 21/6332* | (2011.01) |

(52) U.S. Cl.
CPC ........... *H04N 17/06* (2013.01); *H04N 21/231* (2013.01); *H04N 21/24* (2013.01); *H04N 21/2404* (2013.01); *H04N 21/2747* (2013.01); *H04N 21/4335* (2013.01); *H04N 21/6332* (2013.01)

(58) Field of Classification Search
CPC .... H04N 21/6332; H04N 5/77; H04N 9/8211; H04N 17/06; G11B 27/10; G11B 27/36
USPC ................. 386/263–277, 294; 348/143–160; 725/94, 105
See application file for complete search history.

(56) References Cited

U.S. PATENT DOCUMENTS

| | | | | |
|---|---|---|---|---|
| 8,081,233 B2* | 12/2011 | Inoue | ...................... | G06T 7/254 348/143 |
| 8,089,514 B2* | 1/2012 | Shimizu | ............. | H04N 21/2312 348/154 |
| 2002/0006163 A1 | 1/2002 | Hibi et al. | | |
| 2003/0202099 A1* | 10/2003 | Nakamura | ............. | H04N 7/181 348/153 |
| 2004/0105450 A1* | 6/2004 | Ikuta | ........................ | H04L 29/06 370/401 |
| 2005/0226338 A1* | 10/2005 | Weston | ............ | G08B 13/19645 375/240.25 |
| 2007/0216780 A1* | 9/2007 | Umezaki | ............ | G11B 27/3027 348/231.6 |
| 2007/0288974 A1* | 12/2007 | Creamer | ............ | H04N 1/00214 725/105 |
| 2013/0179625 A1* | 7/2013 | Stanton | .................. | G08B 29/16 711/103 |
| 2013/0235209 A1* | 9/2013 | Lee | ........................ | H04N 5/765 348/159 |
| 2014/0098228 A1* | 4/2014 | Plante | .............. | H04N 21/23406 348/148 |
| 2014/0139664 A1* | 5/2014 | Herzel | ................... | H04N 5/765 348/143 |
| 2014/0247324 A1* | 9/2014 | Cury | ...................... | H04N 7/183 348/36 |
| 2014/0281523 A1* | 9/2014 | Golino | ................ | H04L 63/0428 713/168 |
| 2015/0358576 A1* | 12/2015 | Hirose | ................... | G11B 27/36 348/143 |

FOREIGN PATENT DOCUMENTS

| | | |
|---|---|---|
| JP | 2001-309354 A | 11/2001 |
| JP | 2001-333416 A | 11/2001 |
| JP | 2003-284044 A | 10/2003 |
| JP | 2003-319375 A | 11/2003 |
| JP | 2005-170258 A | 6/2005 |
| JP | 2006-331150 A | 12/2006 |
| JP | 2006-350694 A | 12/2006 |
| JP | 2008-199302 | 8/2008 |
| JP | 2008-263370 A | 10/2008 |
| JP | 2012-169754 A | 9/2012 |

OTHER PUBLICATIONS

Extended European Search Report dated Jun. 8, 2016 for corresponding European Patent Application No. 13894095.2, 7 pages. *Please note US-2003/0202099-A1 cited herein, was previously cited in an IDS filed Mar. 24, 2016.*.
Korean Office Action dated Jul. 25, 2017 for corresponding Korean Patent Application No. 10-2016-7007962, with English Translation, 8 pages. *Please note JP-2003-319375-A, JP-2005-170258-A, JP-2001-309354-A, JP-2012-169754-A and JP-2008-199302-A cited herewith, were previously cited in an IDS filed on Mar. 24, 2016 and Mar. 31, 2017, respectively.*
European Office Action dated Apr. 21, 2017 for corresponding European Patent Application No. 13894095.2, 4 pages. *Please note D1, US-2003/0202099-A1 and D2, US-7526787-B1 cited herewith, were previously cited in an IDS filed on Jun. 16, 2016.*
Korean Office Action dated Jan. 6, 2017 for corresponding Korean Patent Application No. 10-2016-7007962, with English Translation, 10 pages. *Please note JP-2003-319375-A cited herewith, was previously cited in an IDS filed on Mar. 24, 2016.*
European Office Action dated Apr. 20, 2018 for corresponding European Patent Application No. 13894095.2, 5 pages. *Please note D1, which is US-2003/0202099-A1 cited herewith, was previously cited in an IDS filed on Mar. 24, 2016.*
European Office Action dated Nov. 23, 2017 for corresponding European Patent Application No. 13894095.2, 5 pages. *Please note US-2003/0202099-A1 listed as D1 cited herewith, was previously cited in an IDS filed on Mar. 24, 2016.*

* cited by examiner

FIG.4B
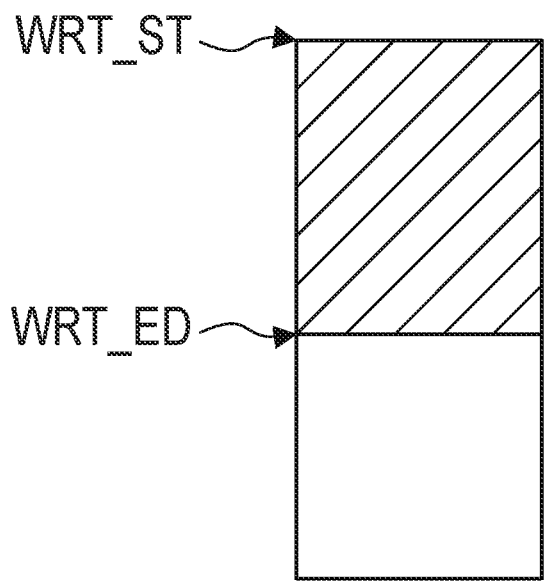
 FOOTAGE DATA NOT SUBJECT TO PROTECTION

FIG.4C
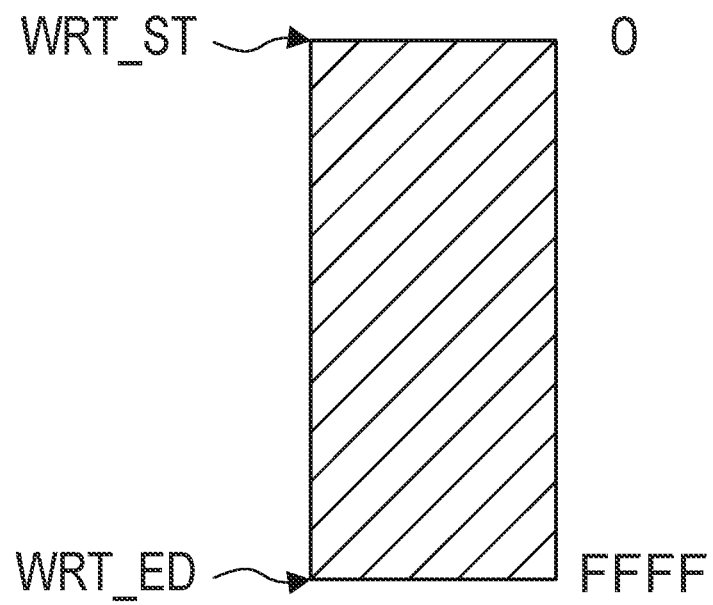
 FOOTAGE DATA NOT SUBJECT TO PROTECTION

FIG.4D
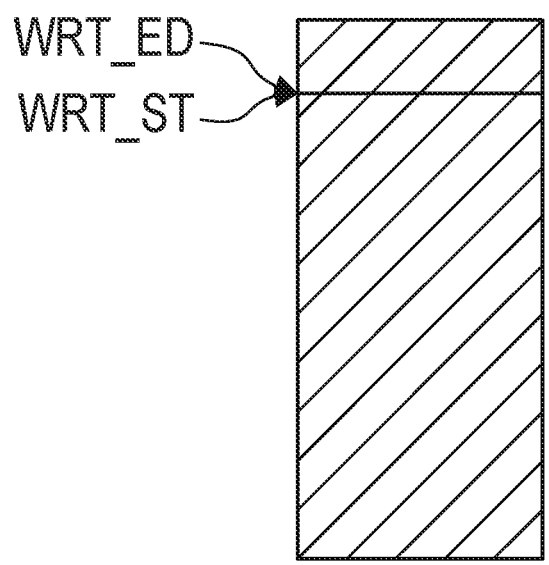
 FOOTAGE DATA NOT SUBJECT TO PROTECTION

FIG.4E
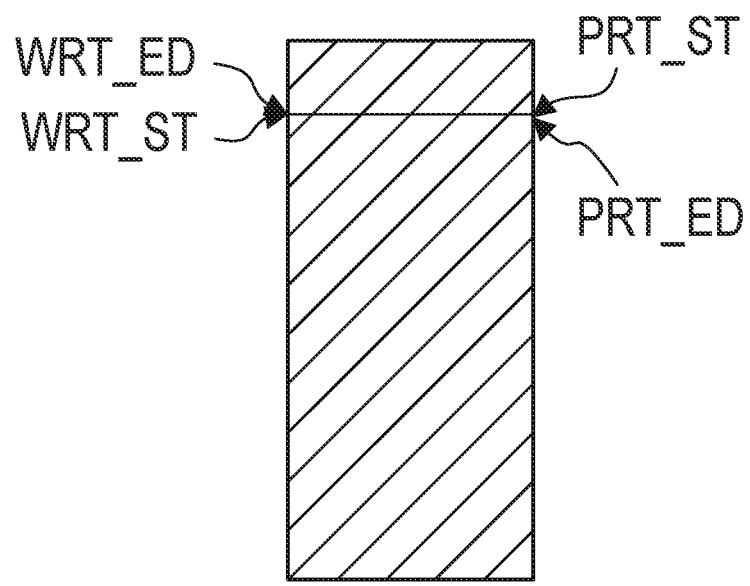
 FOOTAGE DATA NOT SUBJECT TO PROTECTION

FIG.4F
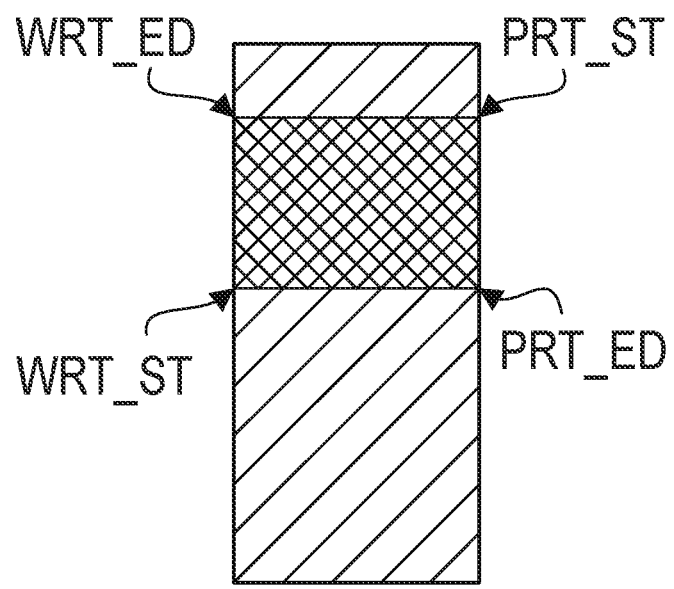
 FOOTAGE DATA NOT SUBJECT TO PROTECTION
 FOOTAGE DATA SUBJECT TO PROTECTION

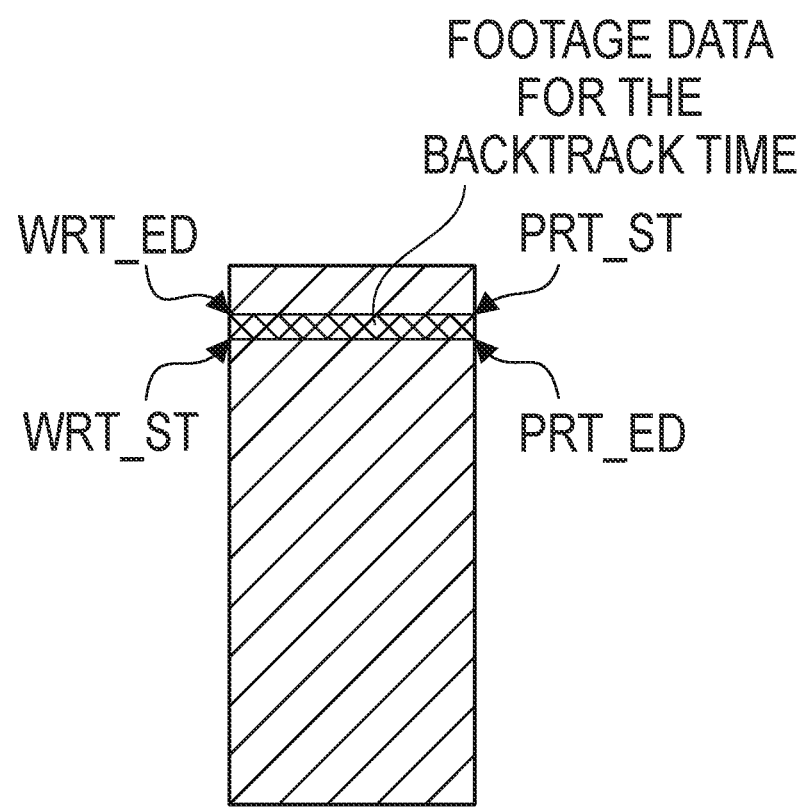

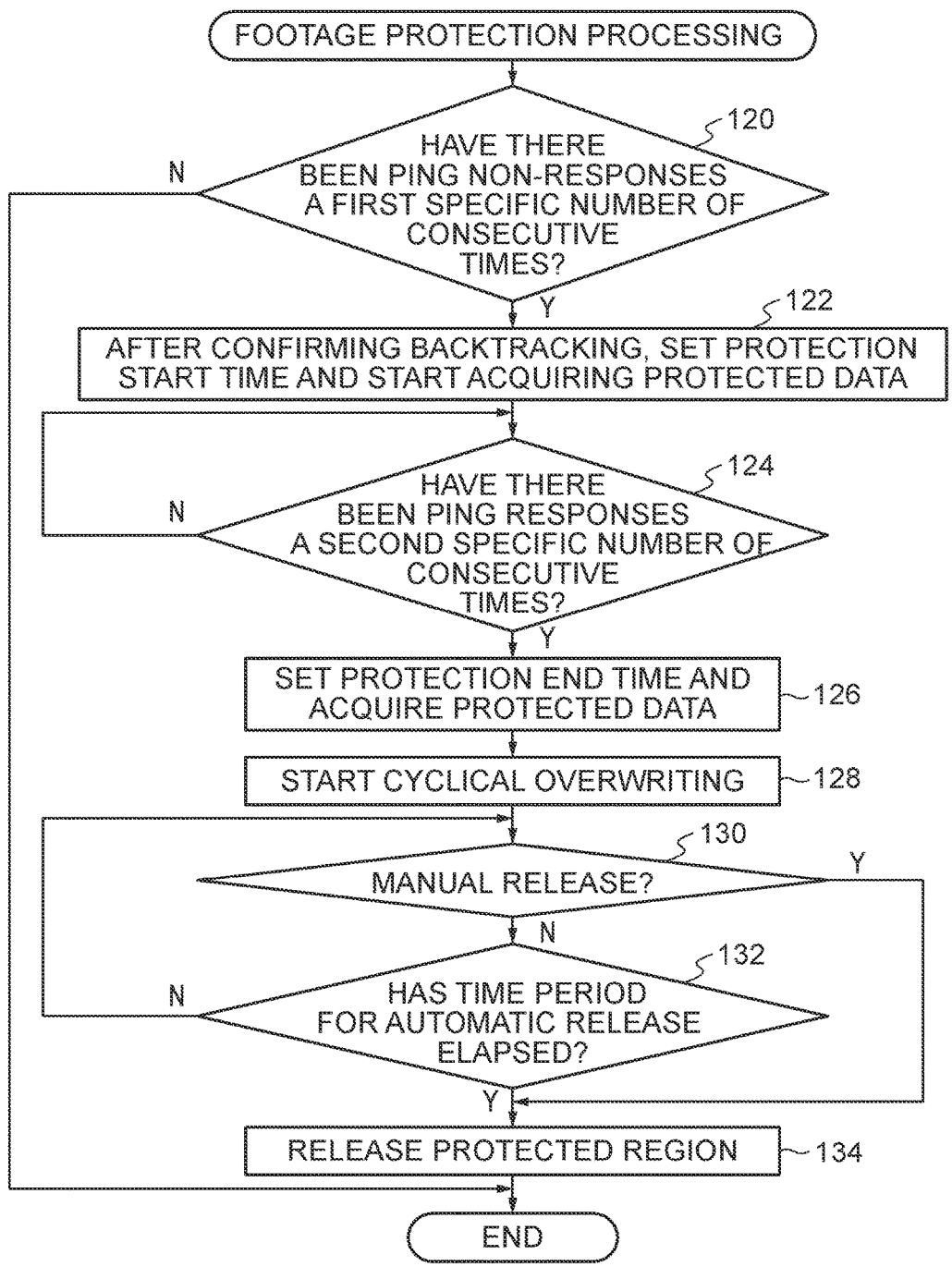

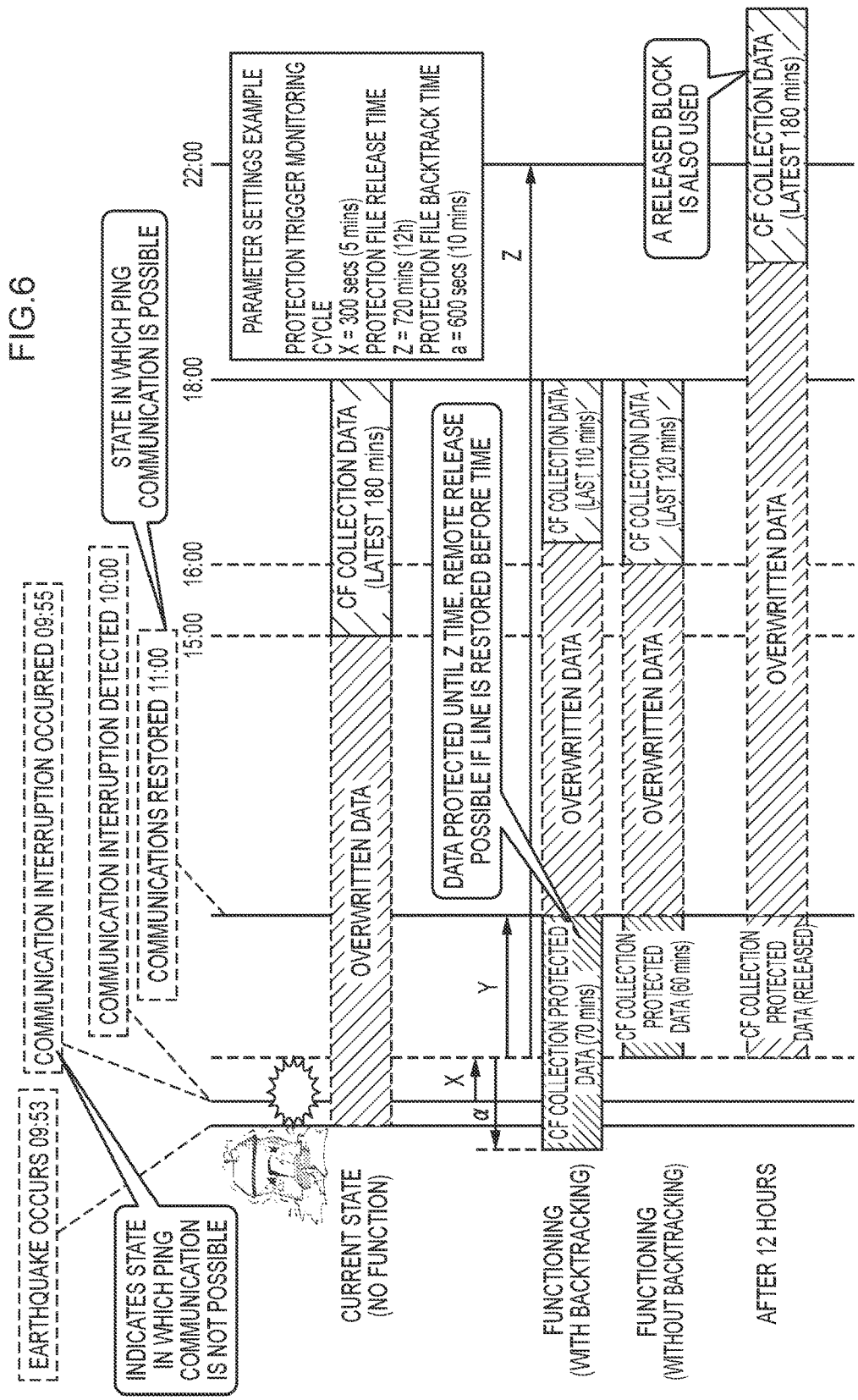

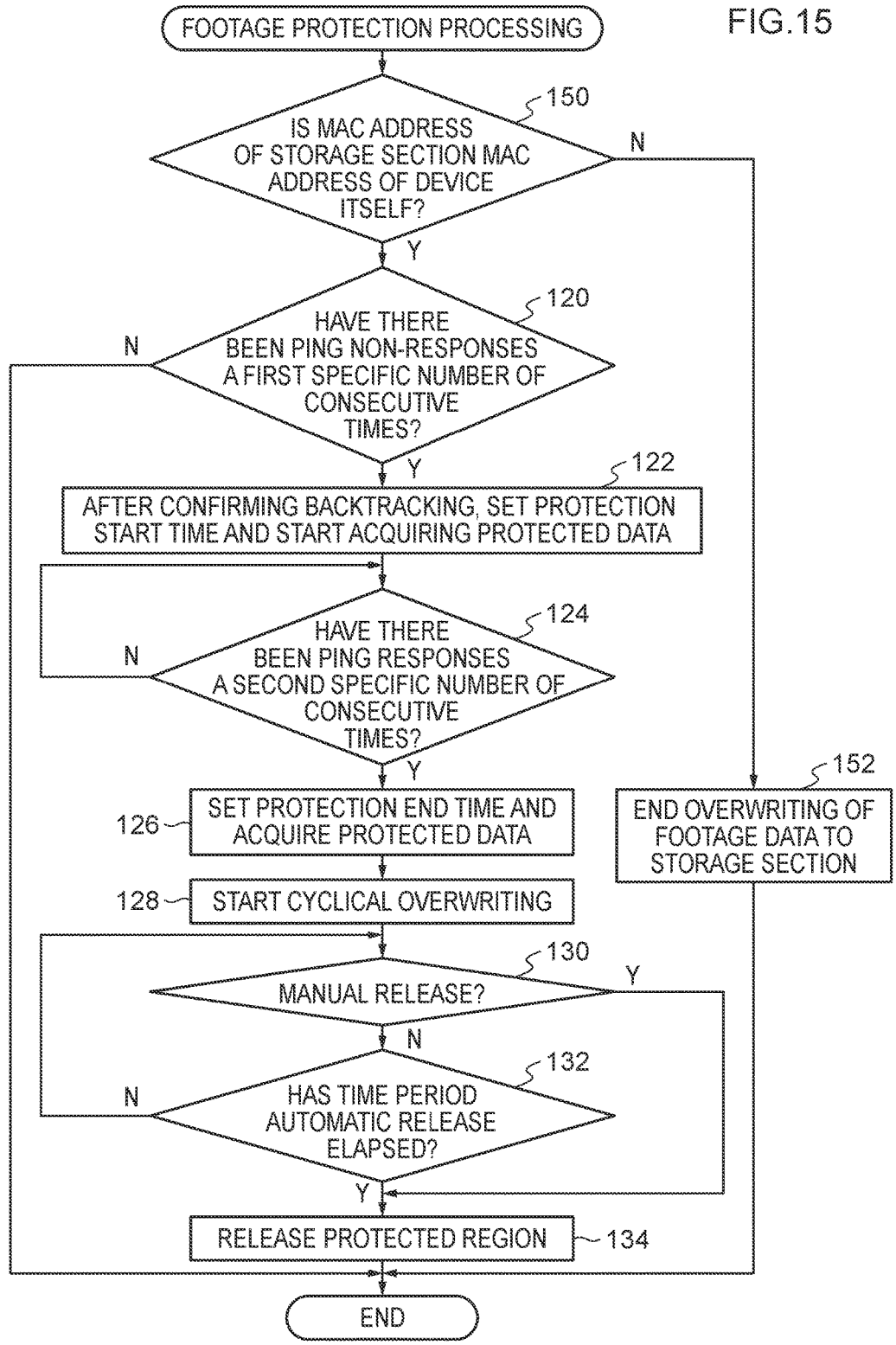

FOOTAGE COLLECTING/BROADCASTING DEVICE, FOOTAGE COLLECTING/BROADCASTING SYSTEM, FOOTAGE COLLECTING/BROADCASTING METHOD, AND RECORDING MEDIUM RECORDED WITH A PROGRAM

CROSS-REFERENCE TO RELATED APPLICATION

This application is a continuation application of International Application No. PCT/JP2013/076613, filed Sep. 30, 2013, the disclosure of which is incorporated herein by reference in its entirety.

FIELD

The embodiments discussed herein are related to a footage collecting/broadcasting device, a footage collecting/broadcasting system, a footage collecting/broadcasting method, a program, and a recording medium recorded with a program.

BACKGROUND

The following technologies have been proposed as technology that saves footage in times of emergencies such as when an earthquake occurs, and technology that detects triggers for saving footage.

In a first technology, when at least one out of vibrations, wind speed, or rainfall at a reference value or above is detected, footage captured by a camera capable of capturing the state outdoors is recorded in a footage recording means, and displayed in real time on a display screen.

In a second technology, when shaking by an earthquake is detected using a shaking sensor, shots recording subjects that are known in advance to clearly indicate the condition of the shaking during an earthquake occurrence are executed, VTR recording is started, and a switch in footage recording speed from a long time mode to a standard mode, or the like is commanded.

In a third technology, a packet of a PING command is transmitted from a monitoring device to a machine subject to monitoring, faults in the machine subject to monitoring are checked for using the transmitted packet, and when a fault in the machine subject to monitoring is detected, the packet of the PING command is retransmitted from the monitoring device to the machine subject to monitoring. Then, a response rate is computed by counting responses to the transmitted packet from the machine subject to monitoring, and faults in the machine subject to monitoring are determined based on the response rate.

In a fourth technology, a monitoring camera terminal constantly records to an internal recording medium such that captured footage is overwritten starting from the oldest footage, transmits packets including monitoring footage data to a monitoring controller, and accepts reception packets from the monitoring controller during a predetermined interval. When reception packets cannot be received, it is determined that the monitoring controller is broken or malfunctioning, and overwriting of footage in the internal recording medium for the time around when the breakage occurred is suspended.

RELATED PATENT DOCUMENTS

Japanese Patent Application Laid-Open (JP-A) No. 2006-331150

JP-A No. H10-104738
JP-A No. 2006-350694
JP-A No. 2003-319375

SUMMARY

According to an aspect of the embodiments, a footage collecting/broadcasting device, comprising: a memory; and a processor configured to execute a procedure, the procedure including: cyclically overwriting and storing sequentially input footage data in a storage section; periodically transmitting an existence confirmation request to an external device; detecting an existence confirmation response from the external device; setting a point in time reached by backtracking by a set time as a first start time to start protection of the footage data, the protection excluding the input footage data from an overwrite target, in cases in which the existence confirmation response from the external device is not detected a first specific number of times; and excluding, from the footage data subject to the protection, the footage data input after the existence confirmation response has been detected a second specific number of times, in cases in which the existence confirmation response from the external device has been detected the second specific number of times after the protection of the footage data has started.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4B is a schematic diagram illustrating an example of storing and protecting footage data in a storage section;

FIG. 4C is a schematic diagram illustrating an example of storing and protecting footage data in a storage section;

FIG. 4D is a schematic diagram illustrating an example of storing and protecting footage data in a storage section;

FIG. 4E is a schematic diagram illustrating an example of storing and protecting footage data in a storage section;

FIG. 4F is a schematic diagram illustrating an example of storing and protecting footage data in a storage section;

FIG. 4G is a schematic diagram illustrating an example of storing and protecting footage data in a storage section;

FIG. 5 is a flowchart illustrating an example of footage protection processing according to the first exemplary embodiment;

FIG. 6 is a schematic diagram illustrating an example of a state in which footage data has been stored in a storage section;

FIG. 15 is a flowchart illustrating an example of footage protection processing according to the fifth exemplary embodiment.

DESCRIPTION OF EMBODIMENTS

Detailed explanation follows regarding examples of exemplary embodiments of technology disclosed herein, with reference to the drawings.

First Exemplary Embodiment

Figure 1:
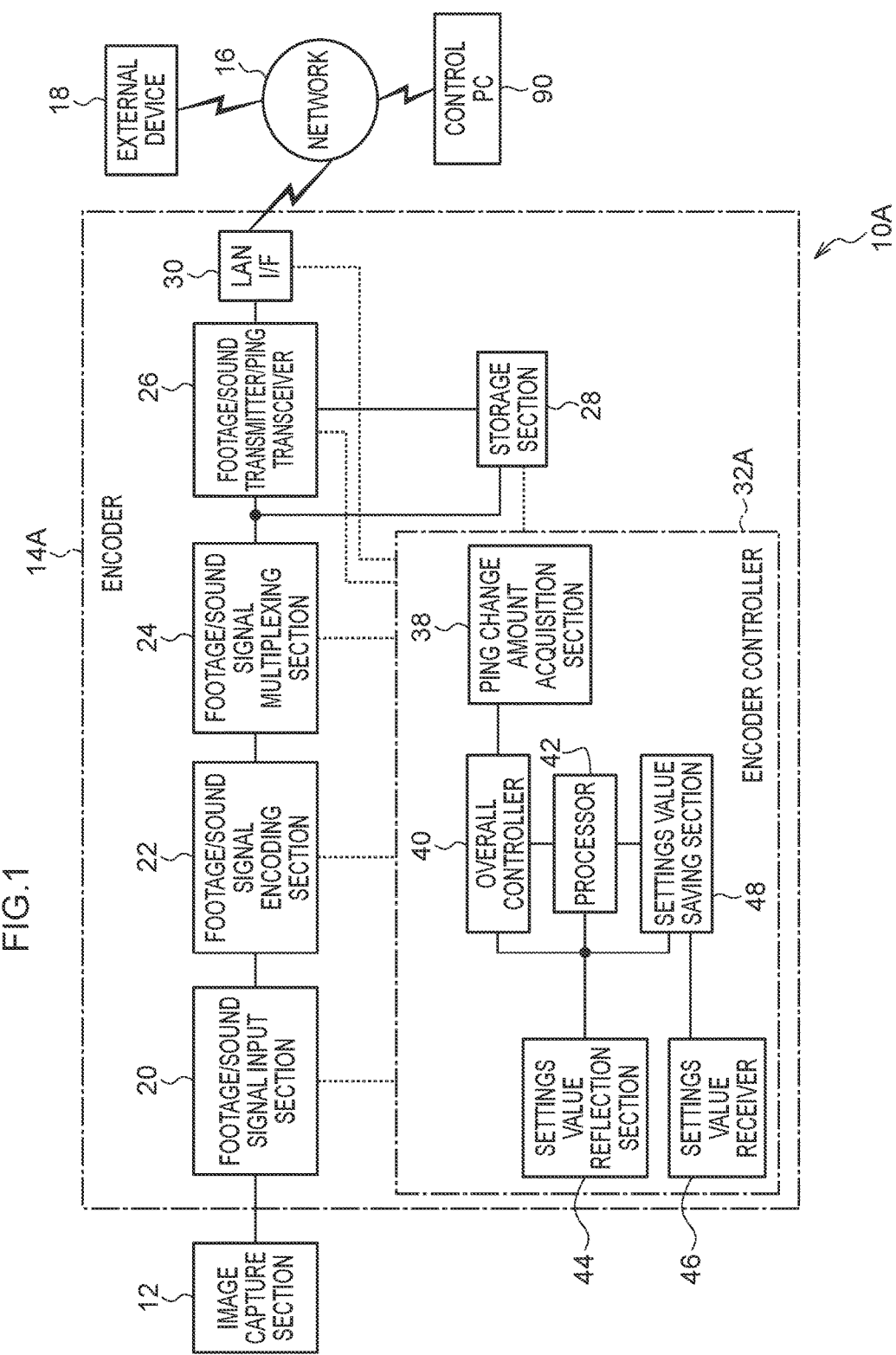
FIG. 1 is a block diagram illustrating an example of a schematic configuration of a footage collecting/broadcasting system according to a first exemplary embodiment.

A footage collecting/broadcasting system 10A according to a first exemplary embodiment is illustrated in FIG. 1. The footage collecting/broadcasting system 10A includes a footage capture section 12, an encoder 14A connected to the footage capture section 12, and an external device 18 connected to the encoder 14A through a network 16.

The footage capture section 12 is disposed as, for example, a fixed point camera, so as to capture footage of a particular subject (for example, a subject visible from a rooftop of a building, or a subject positioned in a particular indoor room). The footage capture section 12 constantly outputs footage signals representing footage of the subject, including sound signals collected by a microphone. The footage capture section 12 is an example of an imaging device of technology disclosed herein.

The encoder 14A is an example of a footage collecting/broadcasting device according to technology disclosed herein. The encoder 14A encodes footage signals input from the footage capture section 12, collects the encoded footage data, and broadcasts the encoded footage data to the external device 18 through the network 16.

The external device 18 is an example of an external device of technology disclosed herein. The external device 18 includes, for example, a footage data receiving PC, and receives the footage data captured by the footage capture section 12 and encoded by the encoder 14A, via the network 16. The external device 18 transmits a response to a packet of a PING (Packet Internet Groper) command in cases in which a packet of a PING command has been received from the encoder 14A through the network 16.

A packet of a PING command transmitted from the encoder 14A is an example of an existence confirmation request, and a response transmitted from the external device 18 to a packet of a PING command is an example of an existence confirmation response. A control PC 90, employed when settings information is input to the encoder 14A, is also connected to the network 16.

Next, detailed explanation follows regarding the encoder 14A. The encoder 14A includes a footage/sound signal input section 20, a footage/sound signal encoding section 22, a footage/sound signal multiplexing section 24, a footage/sound transmitter/PING transceiver 26, a storage section 28, a LAN I/F section 30, and an encoder controller 32A.

The footage/sound signal input section 20 acquires a footage signal including a sound signal from the footage capture section 12. The footage/sound signal encoding section 22 respectively encodes the footage and sound signals acquired by the footage/sound signal input section 20 using a specific encoding method. The footage/sound signal multiplexing section 24 multiplexes a stream of the footage and the sound output from the footage/sound signal encoding section 22 into a single footage/sound stream.

The footage/sound transmitter/PING transceiver 26 transmits, to the external device 18 through the LAN I/F section 30 and the network 16, the single footage/sound stream output from the footage/sound signal multiplexing section 24. Moreover, the footage/sound transmitter/PING transceiver 26 includes PING transceiver functionality for transmitting packets of PING commands to the external device 18 via the LAN I/F section 30, and receiving responses from the external device 18 to transmitted packets of PING commands, in order to confirm the existence of the external device 18.

Figure 2:
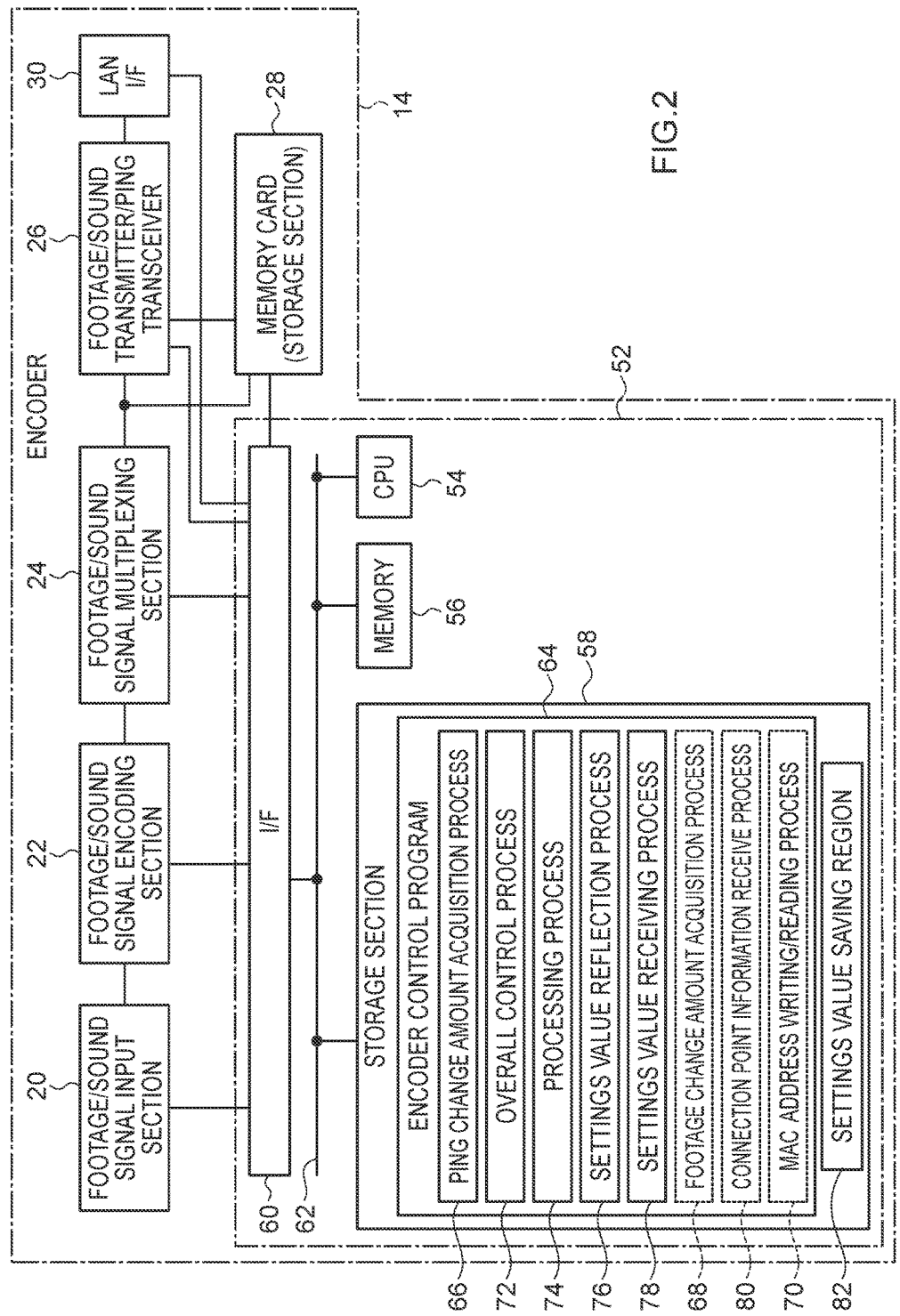
FIG. 2 is a schematic block diagram illustrating an example of a hardware configuration of an encoder.

The storage section 28 cyclically overwrites and stores the single footage/sound stream sequentially output from the footage/sound signal multiplexing section 24 as footage data. As illustrated in FIG. 2, the storage section 28 may be implemented by a memory card such as flash memory that can be added to or removed from an encoder 14A main body (more specifically, a COMPACT FLASH (registered trademark) card, for example).

The encoder controller 32A controls the operation of each section of the encoder 14A. The encoder controller 32A includes a PING change amount acquisition section 38, an overall controller 40, a processor 42, a settings value reflection section 44, a settings value receiver 46, and a settings value saving section 48.

The PING change amount acquisition section 38 causes packets of PING commands to be transmitted from the footage/sound transmitter/PING transceiver 26 to the external device 18 at a particular time interval. Moreover, responses to packets of PING commands are acquired from the external device 18 via the footage/sound transmitter/PING transceiver 26, and changes in the situation of acquired responses are notified to the overall controller 40. Examples of a change in the situation of responses include a case in which there is no response to the packets of PING commands transmitted at the particular time interval a first specific number of times, and cases in which responses have been restored from a state in which there were no responses such that responses to packets of PING commands are received a second specific number of consecutive times. Preset parameters, described below, are set for the time period for transmitting a packet of a PING command, and for the threshold value for the number of responses. The PING change amount acquisition section 38 is an example of a transmitter and a detector of technology disclosed herein.

When the overall controller 40 has been notified by the PING change amount acquisition section 38 that there are no responses to packets of PING commands, the overall controller 40 switches a startup state of the settings value saving section 48 from OFF to ON, and makes a request to the processor 42 to start protecting footage data. Moreover, when the overall controller 40 has been notified by the PING change amount acquisition section 38 that responses to packets of the PING command have been restored, the overall controller 40 switches the startup state of the settings value saving section 48 from ON to OFF, and makes a request to the processor 42 to end the footage data subject to protection. The overall controller 40 is an example of a controller of technology disclosed herein.

When there is a request from the overall controller 40 to protect footage data, the processor 42 sets a footage data protection start time in the settings value saving section 48, and makes a request to the settings value reflection section 44 to reflect this information. When there is a request to end protection of footage data from the overall controller 40, the processor 42 sets a footage data protection end time in the settings value saving section 48, and makes a request to the settings value reflection section 44 to reflect this information. The processor 42 is an example of a processor of technology disclosed herein.

The settings value reflection section 44 reflects the information saved by the settings value saving section 48 and the existing settings values of the encoder 14A in the encoder 14A main body. The settings value receiver 46 receives settings information, and causes the received settings information to be saved in the settings value saving section 48. The settings value saving section 48 saves information passed over from the settings value receiver 46, and information passed over from the overall controller 40 or the processor 42.

For example, as illustrated in FIG. 2, the encoder 14A may be implemented by hardware configured so as to be installed in a computer 52. The computer 52 includes a CPU 54, memory 56, a storage section 58, and an I/F section 60. The CPU 54, the memory 56, the storage section 58, and the I/F section 60 are connected together through a bus 62. The I/F section 60 is respectively connected to the footage/sound signal input section 20, the footage/sound signal encoding section 22, the footage/sound signal multiplexing section 24, the footage/sound transmitter/PING transceiver 26, the memory card (storage section) 28, and the LAN I/F section 30.

The storage section 58 may be implemented by a hard disk drive (HDD), flash memory, or the like. An encoder control program 64 for causing the computer 52 to function as the encoder controller 32A is stored in the storage section 58. The CPU 54 sequentially executes processes included in the encoder control program 64. The encoder control program 64 includes a PING change amount acquisition process 66, an overall control process 72, a processing process 74, a settings value reflection process 76, and a settings value receiving process 78.

The CPU 54 operates as the PING change amount acquisition section 38 illustrated in FIG. 1 by executing the PING change amount acquisition process 66. The CPU 54 operates as the overall controller 40 illustrated in FIG. 1 by executing the overall control process 72. The CPU 54 operates as the processor 42 illustrated in FIG. 1 by executing the processing process 74. The CPU 54 operates as the settings value reflection section 44 illustrated in FIG. 1 by executing the settings value reflection process 76. The CPU 54 operates as the settings value receiver 46 illustrated in FIG. 1 by executing the settings value receiving process 78. A settings value saving region 82 is provided in a storage region of the storage section 58, the settings value saving region 82 functions as the settings value saving section 48.

The computer 52 that executes the encoder control program 64 thereby functions as the encoder controller 32A. The encoder control program 64 is an example of a footage collecting/broadcasting device program according to technology disclosed herein. The computer 52 may be implemented by, for example, a semiconductor integrated circuit, more specifically, by an application specific integrated circuit (ASIC) or the like.

Figure 3:
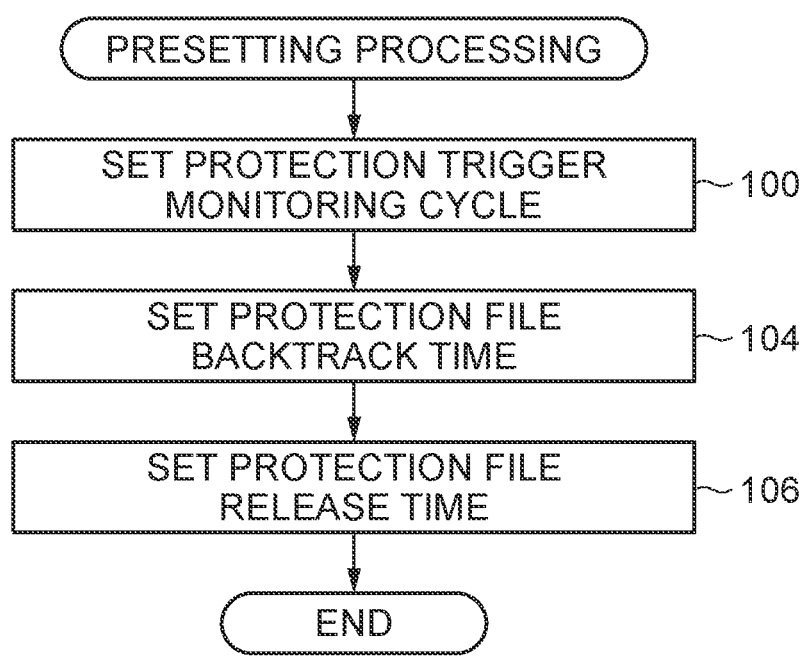
FIG. 3 is a flowchart illustrating an example of presetting processing of the first exemplary embodiment.

Next, to explain operation of the first exemplary embodiment, explanation is first given regarding presetting processing executed when settings information is input through the control PC 90 in a state in which the control PC 90 is connected to the network 16, with reference to FIG. 3.

At step 100 of the presetting processing, a protection trigger monitoring cycle is set through the control PC 90. The protection trigger monitoring cycle is a parameter for determining the start or end of protection of footage data. The protection trigger monitoring cycle includes a time interval at which to check the existence state of the external device 18 by transmitting packets of PING commands, and numbers of times employed when determining that the response to packets of PING commands has become no response, or when determining that the responses have been restored. The parameter of the time interval is, for example, from 1 to 59 seconds, and parameters of the number of times are, for example, from 1 to 10 times. The protection trigger monitoring cycle parameters set through the control PC 90 are received by the settings value receiver 46, and the settings value receiver 46 causes the received protection trigger cycle parameters to be saved in the settings value saving section 48.

At step 104, a protection file backtrack time is set through the control PC 90. The protection file backtrack time is a time stipulating how far the footage data subject to protection is back from the timing at which the protection of footage data started. The backtrack time set through the control PC 90 is received by the settings value receiver 46, and the settings value receiver 46 causes the received backtrack time to be saved in the settings value saving section 48. A time of, for example, from 0 minutes to 10 minutes is set as the protection file backtrack time in the present exemplary embodiment. The protection file backtrack time is set to 0 in cases in which there is no need to backtrack the footage data subject to protection, and operation does not include backtracking of the footage data subject to protection in such cases.

At step 106, a protection file release time is set through the control PC 90. The protection file release time is a time spanning from the start of protection of footage data subject to protection to the release (end) of the protection. The time until the protection file is released set through the control PC 90 is received by the settings value receiver 46, and the settings value receiver 46 causes the received time until the protection file is released to be saved in the settings value saving section 48. A time of, for example, approximately 0 weeks to approximately 1 week is set for the protection file release time. The presetting processing ends when the processing of step 106 ends.

Figure 4A:
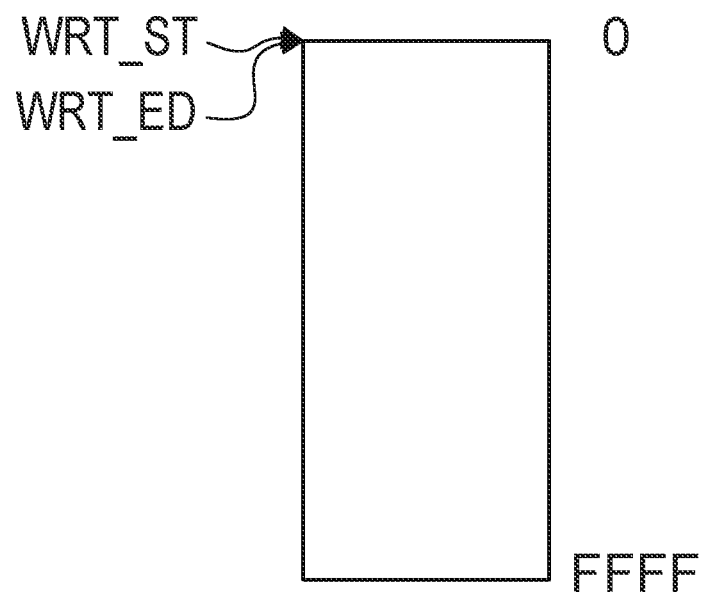
FIG. 4A is a schematic diagram illustrating an example of storing and protecting footage data in a storage section.
Figure 4H:
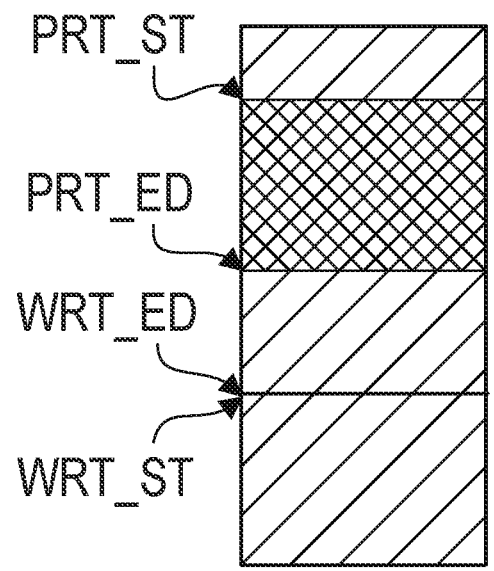
FIG. 4H is a schematic diagram illustrating an example of storing and protecting footage data in a storage section.

Next, explanation follows regarding storage of footage data to the storage section 28 in a state in which disasters and the like are not occurring. As illustrated in FIG. 4A to FIG. 4H, in the present exemplary embodiment, footage data not subject to protection that is stored in the storage section 28 is managed by a pointer (WRT_ST) indicating the start address of a storage region for the footage data not subject to protection, and a pointer (WRT_ED) indicating the end address of the storage region. In a state in which footage data is not stored in the storage section 28, the pointer WRT_ST and the pointer WRT_ED indicate the start address (0) of the storage space of the storage section 28, as illustrated in FIG. 4A.

The encoder 14A is connected to the footage capture section 12, and when footage data is generated due to a footage signal input from the footage capture section 12, the processor 42 causes footage data to be stored from the position indicated by the pointer WRT_ED, and updates the pointer WRT_ED (see FIG. 4B). Storage of footage data in the storage section 28 and updates to the pointer WRT_ED are performed repeatedly until the pointer WRT_ED reaches a state of indicating the end address (FFFF) of the storage space of the storage section 28 (see FIG. 4C).

When the pointer WRT_ED reaches a state of indicating the end address (FFFF) of the storage space of the storage section 28 (see FIG. 4C), the storage section 28 adopts a state in which footage data is stored in the entire region of the storage space. The pointer WRT_ED is therefore first returned to the start address (0) of the storage space of the storage section 28, and footage data is caused to be stored from the position indicated by the pointer WRT_ED, and the pointer WRT_ST and the pointer WRT_ED are both updated (see FIG. 4D). Thus, footage data stored in the storage section 28 is overwritten by new footage data in sequence from the oldest, and footage data is cyclically overwritten and stored in the storage section 28.

Next, explanation follows regarding footage protection processing repeatedly executed by the encoder controller 32A, with reference to FIG. 5. At step 120 of the footage protection processing, the PING change amount acquisition section 38 determines whether or not there has been the first specific number of consecutive times of non-response from the external device 18, to packets of a PING command transmitted to the external device 18 from the encoder 14A. The determination of step 120 employs the number of times parameter set as the protection trigger monitoring cycle described above.

When the determination is negative, it is determined that the state of the network 16 is normal, and the footage protection processing ends. Otherwise, when the determination is affirmative, it can be determined that the state is such that communications with the external device 18 have been severed due to the effect of a disaster or the like occurring. The PING change amount acquisition section 38 therefore notifies the overall controller 40 that there is no response to packets of PING commands. The overall controller 40 thereby switches the startup state of the settings value saving section 48 from OFF to ON, makes a request to the processor 42 for protection of footage data to start, and transitions to step 122.

At step 122, the processor 42 first confirms the protection file backtrack time saved in the settings value saving section 48. Then, the current time is set in the settings value saving section 48 in cases in which the protection file backtrack time set as the footage protection start time is 0, or a time reached by backtracking from the current time by the set backtrack time is set in the settings value saving section 48 in cases in which the set backtrack time is greater than 0. Here, subsequent footage data (and possibly also footage data included in a period tracking back from the current time by the backtrack time) stored by the storage section 28 is treated as footage data subject to protection due to the settings value reflection section 44 reflecting the information set in the settings value saving section 48 in the encoder 14A main body.

In more detail, for example, in the state illustrated in FIG. 4D, a pointer (PRT_ST) indicating the start address of a storage region for the footage data subject to protection, and a pointer (PRT_ED) indicating the end address of the storage region, are set (FIG. 4E). Then, when footage data subject to protection is generated due to a footage signal input from the footage capture section 12, the processor 42 causes the footage data to be stored from the position indicated by the pointer PRT_ED, and the pointer PRT_ED and the pointer WRT_ST are updated (see FIG. 4F).

Note that in cases in which the protection file backtrack time is greater than 0, for example in the state illustrated in FIG. 4D, the pointer WRT_ED is returned to the protection file backtrack time, the pointer PRT_ST is matched to the pointer WRT_ED, and the pointer PRT_ED is matched to the pointer WRT_ST (see FIG. 4G). The footage data of a period tracking back from the current time by the protection file backtrack time is thereby incorporated as footage data subject to protection.

Next, at step 124, the PING change amount acquisition section 38 determines whether or not there have been responses from the external device 18, to packets of PING commands transmitted to the external device 18 from the encoder 14A, the second specific number of consecutive times. The number of times parameter set as the protection trigger monitoring cycle described above is also employed in the determination of step 124. When the determination of step 124 is negative, step 124 is repeated until the determination of step 124 is affirmative. During this time, footage data is stored in the storage section 28 as footage data subject to protection.

When the determination of step 124 is affirmative, the PING change amount acquisition section 38 notifies the overall controller 40 that responses to packets of PING commands have been restored. The overall controller 40 makes a request to the processor 42 to end protection of footage data, and transitions to step 126.

When there is a request from the overall controller 40 to end protection of footage 80 data, at step 126, the processor 42 sets a footage data protection end time in the settings value saving section 48, and makes a request to the settings value reflection section 44 for information reflection. Storage of footage data subject to protection to the memory card (storage section) 28 is thereby ended, and processing transitions to step 128.

In subsequent storage of footage data to the storage section 28, the pointer WRT_ED is updated so as to match the pointer PRT_ED when the pointer WRT_ED has reached the pointer PRT_ST. Subsequent overwriting and storage of footage data in the storage section 28 is thus performed in a region outside of the protected region, which starts at the pointer PRT_ST and ends at the pointer WRT_ED, and footage data subject to protection stored in the protected region is prevented from being overwritten with footage data not subject to protection.

At step 128, the processor 42 causes cyclical over writing and storage of footage data to start in an overwriting storage region in which storage capacity has been decreased. Thus, footage data stored in the overwriting storage region of the storage section 28 is overwritten by new footage data in sequence from the oldest, and footage data is cyclically overwritten and stored in the storage section 28 within the overwriting storage region (see also FIG. 4H).

FIG. 6 illustrates, as an example, a state of footage data stored in the storage section 28, in a case in which, as an example, an earthquake occurs at 09:53, a communications cutoff occurs at 09:55, the communications cutoff is detected at 10:00, and communications are restored at 11:00. Note that the storage capacity of the memory card (storage section) 28 in FIG. 6 is assumed to be sufficient to store 180 minutes (3 hours) of footage data, and the footage data collected in the memory card (storage section) 28 is checked at 18:00 (excluding the lowest stage of the figure labelled "after 12 hours").

In cases in which protection of footage data subject to protection like that of the present exemplary embodiment has not been performed, as indicated at the label "current state (no function)" in FIG. 6, at a point in time of 18:00 at which 8 hours have elapsed since the earthquake occurred, the footage data of the time of the earthquake occurring (from 09:53 to 11:00) has been overwritten. However, in cases in which protection of footage data subject to protection like that of the present exemplary embodiment has been performed, as indicated at the labels "functioning (with backtracking)" and "functioning (without backtracking)" in FIG. 6, the footage data of the time of the earthquake occurring (from 09:53 to 11:00) is still saved even at the point in time of 18:00.

At the next step 130, the processor 42 determines whether or not there has been a manual instruction to release the protected region. Processing transitions to step 132 when the determination of step 130 is negative. At the next step 132, the processor 42 references the time until automatic release stored in the settings value saving section 48, and determines whether or not the time until the automatic release has elapsed. When the determination at step 132 is negative, processing returns to step 130, and step 130 and step 132 are repeated until the determination of either step 130 or step 132 is affirmative.

A manual release of the protected region is instructed in cases in which recovery has been made from a cutoff state of communication between the encoder 14A and the external device 18 and the footage data subject to protection has been transferred from the encoder 14A to the external device 18. In cases in which an instruction to release the protected region manually is given before the time until the automatic release has elapsed, the determination of step 130 is affirmative and processing transitions to step 134.

In cases in which the time until automatic release has elapsed without manual release of the protected region being instructed, affirmative determination is made at step 132 and processing transitions to step 134.

At step 134, the processor 42 releases the protected region (see also "after 12 hours" in FIG. 6) and ends the footage protection processing.

In the first exemplary embodiment as explained above, a point in time reached by backtracking by a set time is set as a first starting time to start protection of footage data in cases in which responses from the external device 18 to packets of a PING command are not detected the first specific number of times. Moreover, control is made such that the subsequent input footage data is excluded from being subject to protection in cases in which, following the start of protection of footage data, responses from the external device 18 to packets of PING commands are detected the second specific number of times. Protection preventing overwrite of the needed footage data of the time of a disaster occurring, such as the time of an earthquake occurring, is thereby enabled using simple processing (configuration) that detects responses from the external device 18 to packets of PING commands. Moreover, the footage data to be protected is reduced so far as possible to the minimum amount needed around the time of the disaster, and when responses from the external device 18 to packets of PING commands have been restored, storage to empty capacity of the memory card (storage section) 28 is resumed in preparation for the next disaster. Effective utilization of the memory card (storage section) 28 is thereby enabled.

Second Exemplary Embodiment

Figure 7:
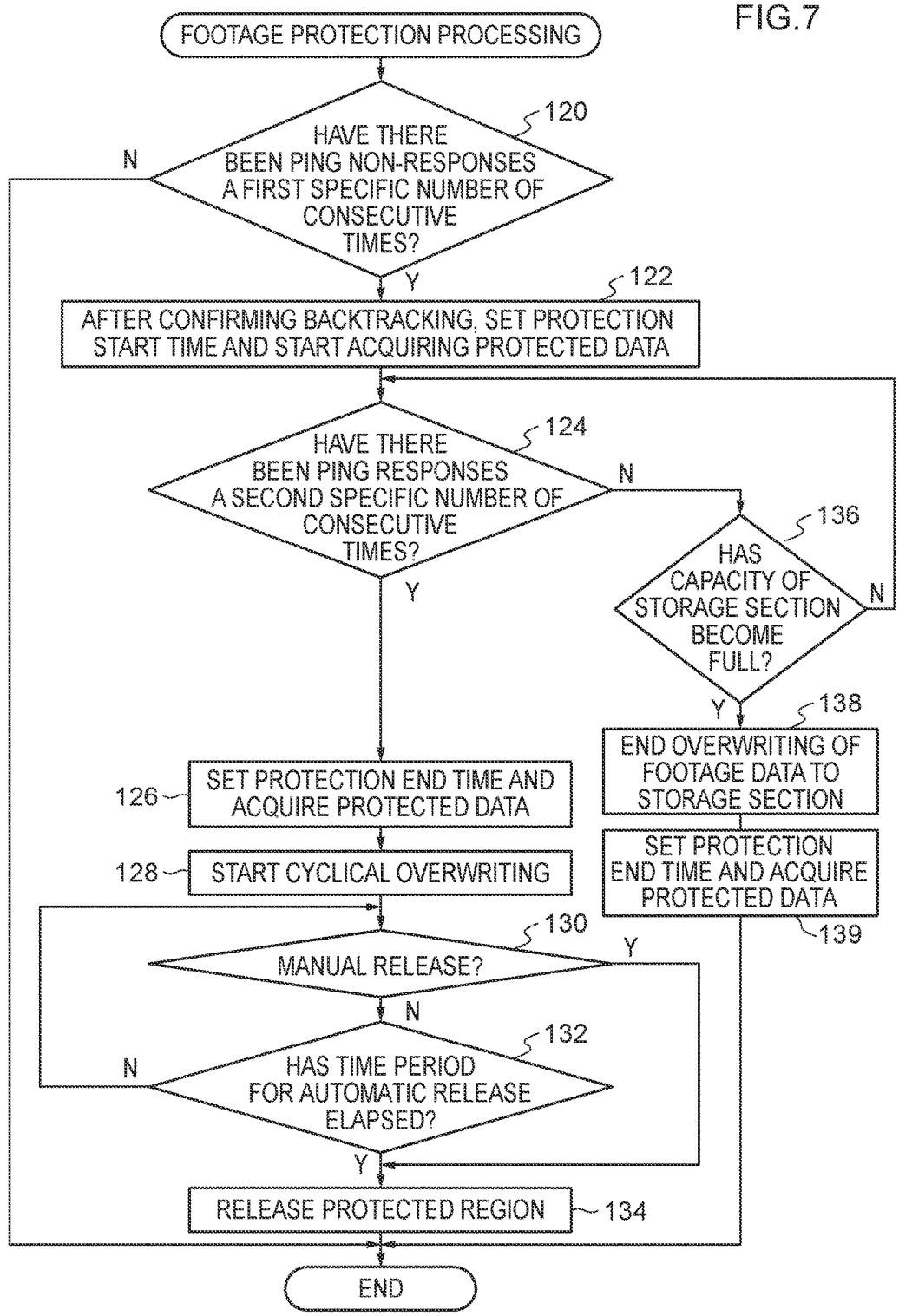
FIG. 7 is flowchart illustrating an example of footage protection processing according to a second exemplary embodiment.

Next, explanation follows regarding a second exemplary embodiment of technology disclosed herein. Since the second exemplary embodiment is configured similarly to the first exemplary embodiment, the same reference numerals are allocated to respective parts and explanation of the configuration is omitted. For the operation of the second exemplary embodiment, explanation of portions different from those of the first exemplary embodiment follows regarding footage protection processing according to the second exemplary embodiment, with reference to FIG. 7.

In the footage protection processing according to the second exemplary embodiment, at step 124, the PING change amount acquisition section 38 determines whether or not there are responses from the external device 18, to packets of PING commands transmitted to the external device 18 from the encoder 14A, the first specific number of consecutive times. Processing transitions to step 136 when the determination of step 124 is negative. At step 136, the overall controller 40 determines whether or not the capacity of the memory card (storage section) 28 has been filled, namely, whether or not the data volume of the footage data subject to protection stored in the memory card (storage section) 28 has reached the storage capacity of the memory card (storage section) 28.

When the determination of step 136 is negative, processing returns to step 124, and the processing of step 124 and step 136 is repeated until the determination of step 124 or step 136 is affirmative. During this time, the footage data is stored in the storage section 28 as footage data subject to protection. Similarly to in the first exemplary embodiment, processing transitions to step 126 when the determination of step 124 is affirmative.

However, when the determination of step 136 is affirmative, the memory card (storage section) 28 is in a state of being full of the footage data subject to protection, and if further writing of footage data to the memory card (storage section) 28 was to occur, overwriting of the footage data subject to protection would result. Therefore, when the determination of step 136 is affirmative, processing transitions to step 138, and writing of footage data to the memory card (storage section) 28 ends. At the next step 139, the footage data protection end time is set in the settings value saving section 48, and a request is made to the settings value reflection section 44 for information reflection. Storage of footage data subject to protection to the memory card (storage section) 28 is thereby ended, and processing transitions to step 130.

Thus, in the second exemplary embodiment, writing of footage data to the memory card (storage section) 28 ends when the memory card (storage section) 28 enters a state of being full of footage data subject to protection. Although new footage data will not be recorded, this enables protection to be performed such that needed footage data of times closer to the disaster occurring will not be overwritten.

Third Exemplary Embodiment

Next, explanation follows regarding a third exemplary embodiment of technology 80 disclosed herein. Note that portions similar to those of the first exemplary embodiment are allocated the same reference numerals and explanation thereof is omitted.

Figure 8:
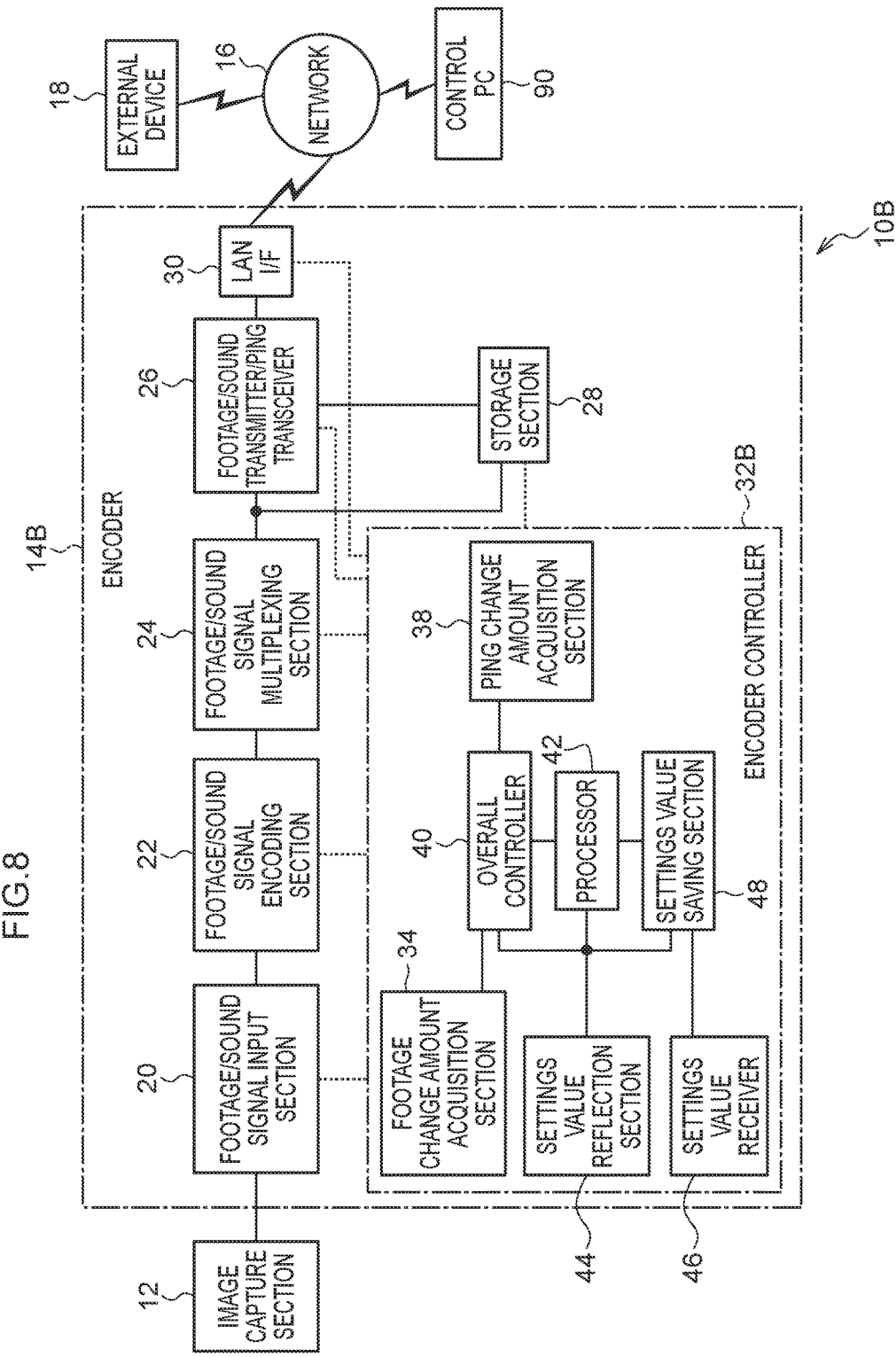
FIG. 8 is a block diagram illustrating an example of a schematic configuration of a footage collecting/broadcasting system according to a third exemplary embodiment.

A footage collecting/broadcasting system 10B according to the third exemplary embodiment is illustrated in FIG. 8. The footage collecting/broadcasting system 10B includes an encoder 14B, and the encoder 14B differs from the encoder 14A explained for the first exemplary embodiment in that a footage change amount acquisition section 34 is provided to an encoder controller 32B.

The footage change amount acquisition section 34 acquires an amount of change in the footage represented by the footage data, and notifies the acquired amount of change in the footage to the overall controller 40. Note that, for example, the magnitude of a movement vector in inter-frame encoding may be employed as the amount of change in the footage. The footage change amount acquisition section 34 is an example of a footage change amount acquisition section of technology disclosed herein.

Moreover, in the third exemplary embodiment, the encoder control program 64 further includes a footage change amount acquisition process 68 as indicated by the dotted line in FIG. 2. In the third exemplary embodiment, the CPU 54 operates as the footage change amount acquisition section 34 illustrated in FIG. 8 by executing the footage change amount acquisition process 68.

Figure 9:
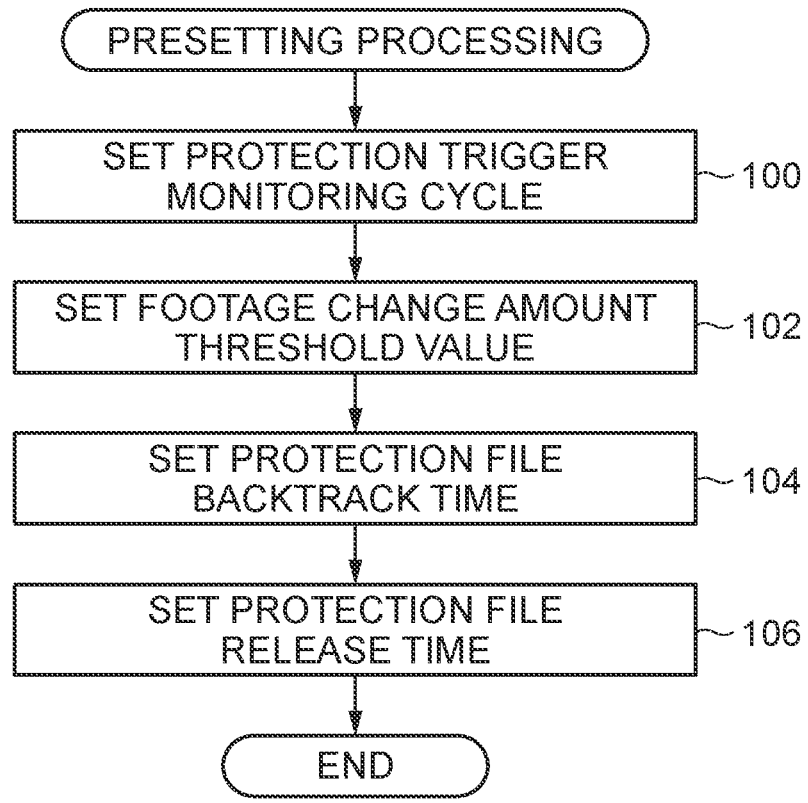
FIG. 9 is a flowchart illustrating an example of presetting processing of the third exemplary embodiment.

Next, explanation first follows regarding presetting processing according to the third exemplary embodiment as operation of the third exemplary embodiment, with reference to FIG. 9. In the presetting processing illustrated in FIG. 9, at step 100, the protection trigger monitoring cycle is set and then processing transitions to step 102.

At step 102, a protection start threshold value, a protection end threshold value, and a suspension determination time are set as footage change amount threshold values, through the control PC 90. The protection start threshold value is a threshold value for the amount of change in the footage for determination whether to start protecting footage data. The protection end threshold value is a threshold value for the amount of change in the footage for determining the end of the footage data subject to protection. The suspension determination time is a threshold value for the time for determining the end of the footage data subject to protection. The protection end threshold value is a smaller value than the protection start threshold value (see FIG. 11). The protection start threshold value, the protection end threshold value, and the suspension determination time set through the control PC 90 are received by the settings value receiver 46, and the settings value receiver 46 causes the received protection start threshold value, protection end threshold value, and suspension determination time to be saved in the settings value saving section 48.

The protection start threshold value is an example of a first threshold value of technology disclosed herein. The protection end threshold value is an example of a second threshold value of technology disclosed herein. The suspension determination time is an example of a specific time of technology disclosed herein. The processing of the next step 104 onward is the same as in the first exemplary embodiment, and explanation thereof is therefore omitted.

Figure 10:
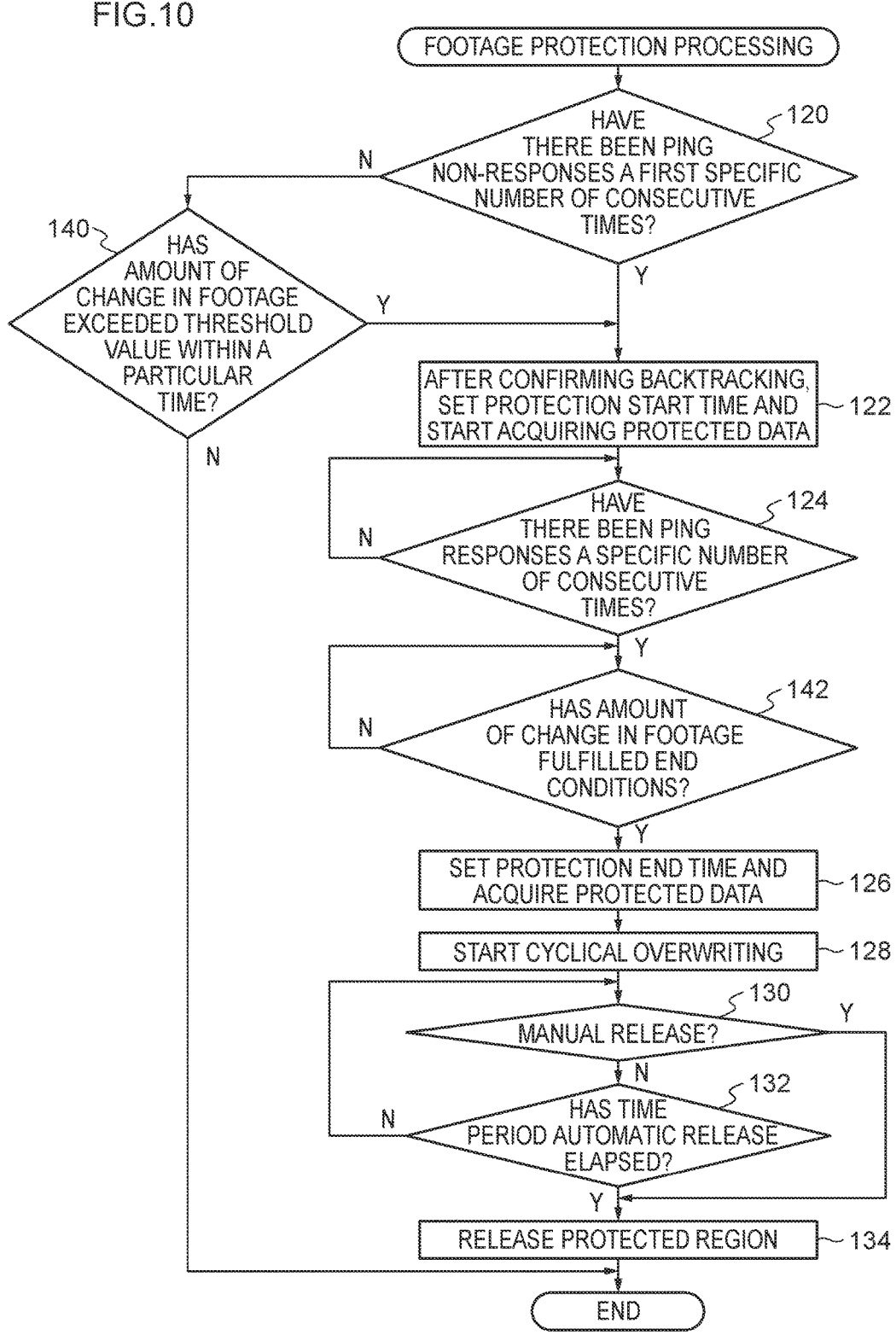
FIG. 10 is a flowchart illustrating an example of footage protection processing according to the third exemplary embodiment.

Next, explanation follows regarding footage protection processing according to the third exemplary embodiment, with reference to FIG. 10. In the footage protection processing according to the third exemplary embodiment, at step 120, the PING change amount acquisition section 38 determines whether or not there is no response from the external device 18, to packets of PING commands transmitted to the external device 18 from the encoder 14A, the first specific number of consecutive times. Processing transitions to step 140 when the determination of step 120 is negative. At step 140, the overall controller 40 determines whether or not the amount of change in the footage notified from the footage change amount acquisition section 34 exceeds the protection start threshold value described above. The footage protection processing ends in cases in which the determination of step 140 was negative.

However, in cases in which there is no response from the external device 18, to packets of PING commands, the first specific number of consecutive times, or the amount of change in the footage has exceeded the protection start threshold value, affirmative determination is made at step 120) or step 140, and processing transitions to step 122. At step 122, the processor 42 first confirms the protection file backtrack time stored in the settings value saving section 48. Then, the current time is set in the settings value saving section 48 in cases in which the set protection file backtrack time is 0, or a time reached by backtracking from the current time by the set backtrack time is set in the settings value saving section 48 in cases in which the set backtrack time is greater than 0. Here, subsequent footage data (and possibly also footage data included in a period tracking back from the current time by the backtrack time) stored to the storage section 28 is treated as footage data subject to protection due to the information set in the settings value saving section 48 being reflected in the encoder 14A main body by the settings value reflection section 44.

At the next step 124, the PING change amount acquisition section 38 determines whether or not there are responses from the external device 18, to packets of PING commands transmitted from the encoder 14A to the external device 18, the second specific number of consecutive times. The processing of step 124 repeats until the determination of step 124 is affirmative in cases in which the determination of step 124 was negative. During this time, the footage data is stored in the storage section 28 as footage data subject to protection.

Moreover, processing transitions to step 142 when the determination of step 124 is affirmative. At step 142, the overall controller 40 determines whether or not the amount of change in the footage notified from the footage change amount acquisition section 34 is the set condition for the end of the protection period, namely, whether or not the condition that a state in which the notified amount of change in the footage is the protection end threshold value or less has been continuously fulfilled for the suspension determination time. When negative determination is made at step 142, the processing of step 142 is repeated until affirmative determination is made at step 142. During this time, the footage data is stored in the storage section 28 as footage data subject to protection.

Moreover, when the amount of change in the footage has fulfilled the set condition for the end of the protection period, the determination of step 142 is affirmative, and the overall controller 40 makes a request to the processor 42 to end footage data subject to protection and transitions to step 126. At step 126, when there has been a request from the overall controller 40 to end protection of footage data, the processor 42 sets the footage data protection end time in the settings value saving section 48, and makes a request to the settings value reflection section 44 for information reflection. Storing of the footage data subject to protection is thereby ended.

Figure 11:
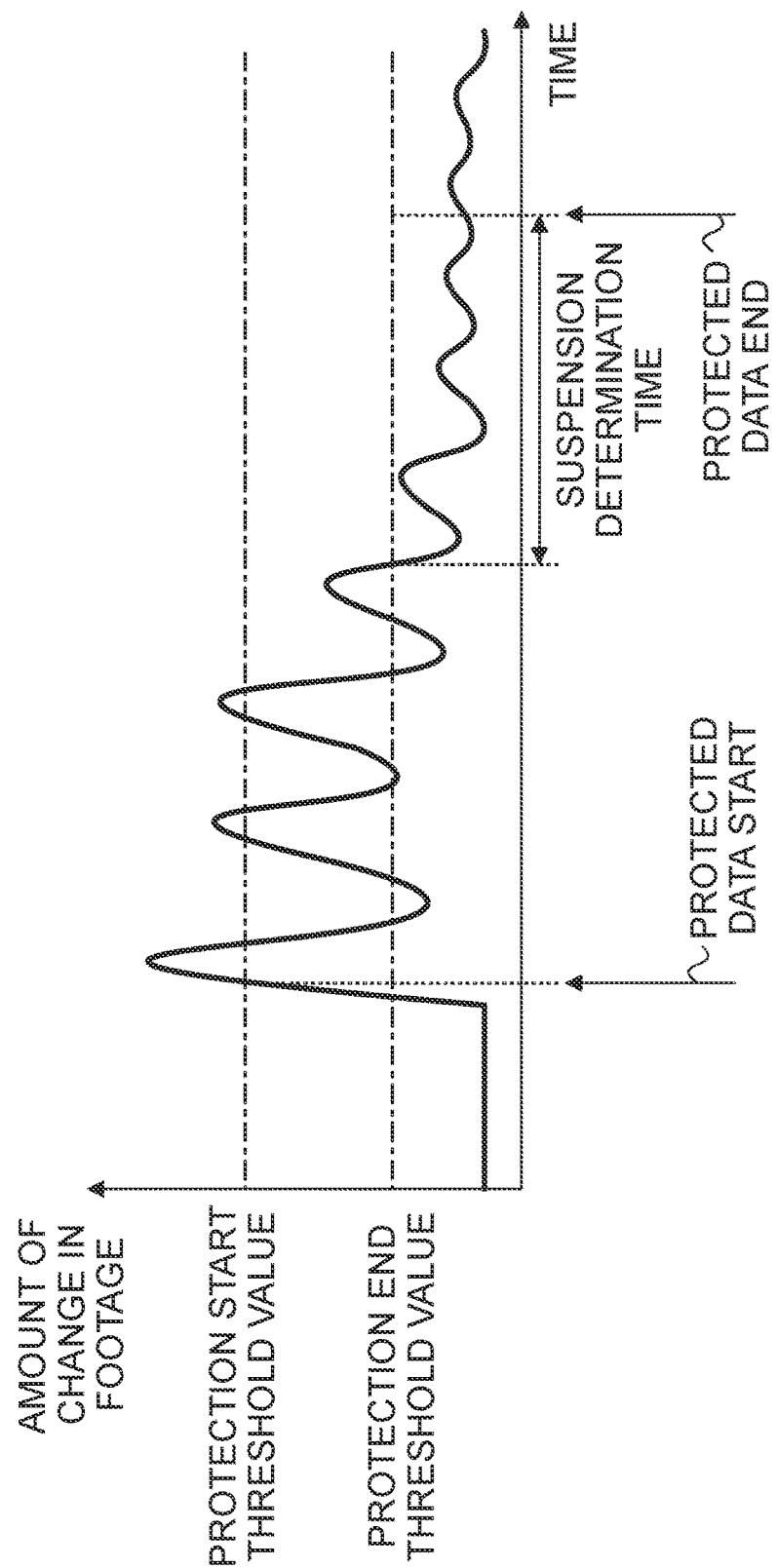
FIG. 11 is a plot illustrating an example of amount of change in footage represented by footage data.

When the notified amount of change in the footage has changed as in FIG. 11 due to an earthquake, serving as an example of a disaster, occurring and shaking arising from the earthquake at an installation position of the footage capture section 12, protection of footage data starts in cases in which the amount of change in the footage is the protection start threshold value or greater (see FIG. 11). Moreover, when the condition that a state of the notified amount of change in the footage being the protection end threshold value or less has continued for the suspension determination time has been fulfilled, protection of footage data is ended in cases in which there are responses of the external device 18 to packets of PING commands for the second specific number of consecutive times (see FIG. 11).

Thus, in the third exemplary embodiment, when the amount of change in the footage notified from the footage change amount acquisition section 34 has exceeded the protection start threshold value, a point in time reached by backtracking by a set time is set as the second start time at which to start protection of footage data. Moreover, when responses of the external device 18, to packets of PING commands, are not detected for the first specific number of times, a point in time reached by backtracking by the set time is set as the first start time at which to start protection of footage data. The earliest time, from out of the second start time or the first start time, is then set as the point in time to start protection of footage 80 data. Thus, when an earthquake, serving as an example of a disaster, occurs earlier than communication with the external device 18 being cut off, footage data of around the time the disaster, such as an earthquake, occurred can be reliably protected.

Moreover, in the third exemplary embodiment, when responses of the external device 18 to packets of PING commands are detected the second specific number of consecutive times, and a state in which the amount of change in the footage is the protection end threshold value or less has continued for the suspension determination time or longer, footage data is excluded from being subject to protection. Thus, even when recovering from the cutoff communications with the external device 18, protection of footage data continues while shaking is arising due to the earthquake at the installation position of the footage capture section 12, such that footage data can be reliably protected during the occurrence of a disaster such as an earthquake.

Fourth Exemplary Embodiment

Next, explanation follows regarding a fourth exemplary embodiment of technology disclosed herein. Portions similar to those of the first exemplary embodiment are allocated the same reference numerals, and explanation thereof is omitted.

Figure 12:
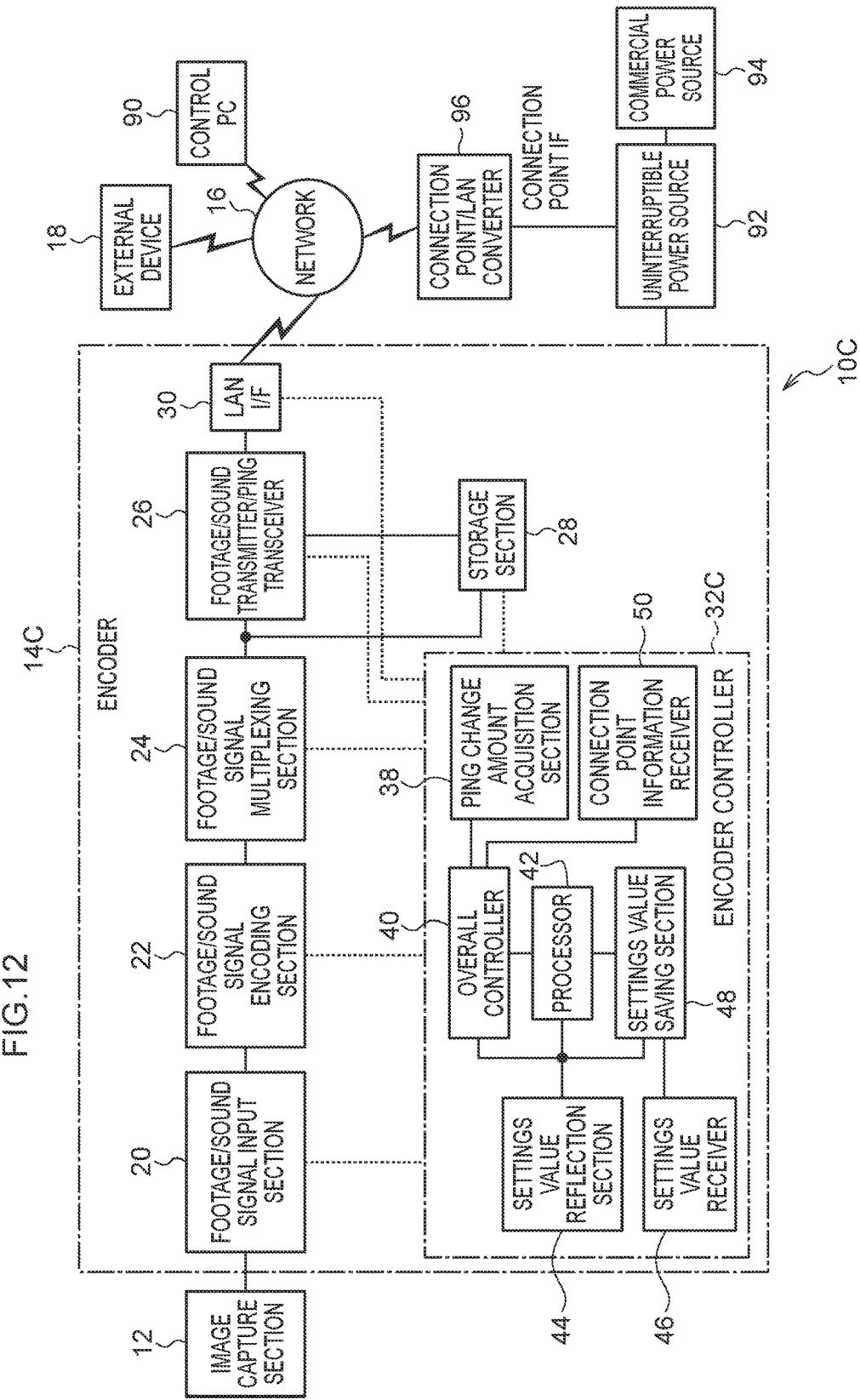
FIG. 12 is a block diagram illustrating an example of a schematic configuration of a footage collecting/broadcasting system according to a fourth exemplary embodiment.

A footage collecting/broadcasting system 10C according to the fourth exemplary embodiment is illustrated in FIG. 12. The footage collecting/broadcasting system 10C includes an encoder 14C, and the encoder 14C differs from the encoder 14A explained in the first exemplary embodiment in that a connection point information receiver 50 is provided to an encoder controller 32C. Moreover, the encoder 14C differs from the encoder 14A explained in the first exemplary embodiment in that a power source line is connected to a commercial power source 94 through an uninterruptible power source 92. The uninterruptible power source 92 is connected to a network 16 through a connection point/LAN converter 96.

In a period in which power is supplied from the commercial power source 94 as normal, the uninterruptible power source 92 supplies the power supplied from the commercial power source 94 as is to the encoder 14C (a first state).

Moreover, in cases in which supply of power from the commercial power source 94 is suspended due to the influence of a disaster or the like, the uninterruptible power source 92 supplies power collected in the device itself to the encoder 14C (a second state). A connection point signal output terminal is provided to the uninterruptible power source 92, and the uninterruptible power source 92 outputs, from the connection point signal output terminal, a connection point signal that has a signal level that differs between the case of the first state and the case of the second state. The connection point/LAN converter 96 is connected to the connection point signal output 80 terminal of the uninterruptible power source 92, and the connection point signal output from the uninterruptible power source 92 is converted into connection point information that can be transmitted to the network 16, and is output to the encoder 14C, by the connection point/LAN converter 96.

The connection point information receiver 50 receives the connection point information transmitted from the uninterruptible power source 92 via the connection point/LAN converter 96, and notifies the received connection point information to the overall controller 40. Note that the connection point information is information indicating whether the power being supplied to the encoder 14C is from the commercial power source 94 or from the uninterruptible power source 92. The commercial power source 94 is an example of a main power source of technology disclosed herein, and the uninterruptible power source 92 is an example of an auxiliary power source of technology disclosed herein.

Moreover, in the fourth exemplary embodiment, the encoder control program 64 further includes a connection point information reception process 80 as indicated by the dotted line in FIG. 2. In the fourth exemplary embodiment, the CPU 54 operates as the connection point information receiver 50 illustrated in FIG. 12 by executing the connection point information reception process 80.

Figure 13:
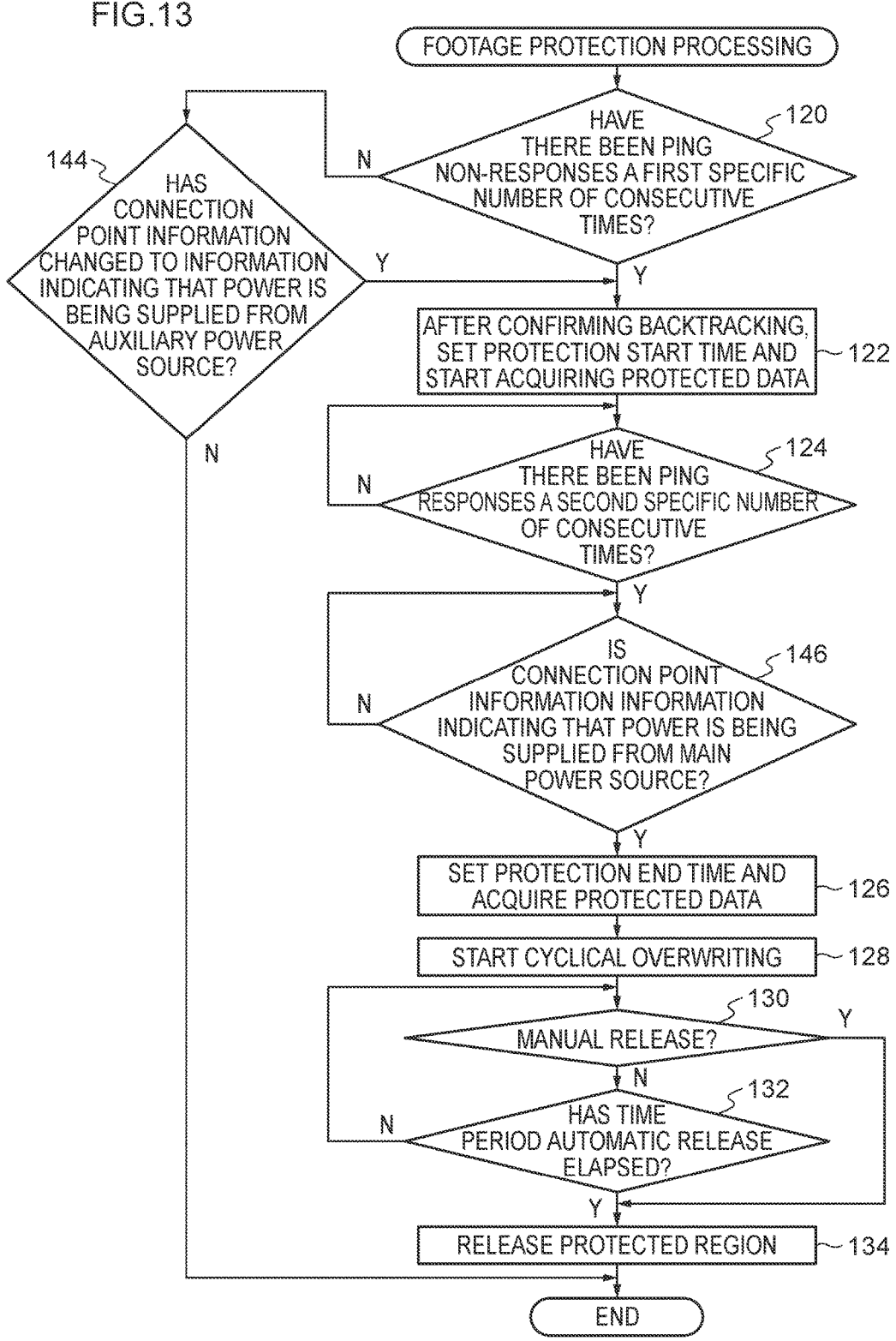
FIG. 13 is a flowchart illustrating an example of footage protection processing according to the fourth exemplary embodiment.

Next, explanation follows regarding footage protection processing according to the fourth exemplary embodiment, with reference to FIG. 13. In the footage protection processing according to the fourth exemplary embodiment, at step 120, the PING change amount acquisition section 38 determines whether or not there are no responses from the external device 18, to packets of PING commands transmitted from the encoder 14C to the external device 18, for the first specific number of consecutive times. Processing transitions to step 144 when the determination of step 120 is negative. At step 144, the overall controller 40 determines whether or not connection point information received and notified by the connection point information receiver 50 has changed to information indicating that the power is being supplied from the uninterruptible power source 92, which serves as an example of an auxiliary power source. The footage protection processing ends when the determination of step 144 is negative.

However, when there are no responses from the external device 18, to packets of PING commands, for the first specific number of consecutive times, or the connection point information has changed to information indicating that power is being supplied from the uninterruptible power source 92, the determination of step 120 or step 144 is affirmative. Processing transitions to step 122 when the determination of step 120 or step 144 is affirmative. At step 122, the processor 42 first confirms a protection file backtrack time saved in the settings value saving section 48. Then, the current time is set in the settings value saving section 48 in cases in which the set protection file backtrack time is 0, or a time reached by backtracking from the current time by the set backtrack time is set in the settings value saving section 48 in cases in which the set backtrack time is greater than 0. Here, subsequent footage data (and possibly also footage data included in a period tracking back from the current time by the backtrack time) stored to the storage section 28 is treated as footage data subject to protection due to the information set in the settings value saving section 48 being reflected in the encoder 14A main body by the settings value reflection section 44.

At the next step 124, the PING change amount acquisition section 38 determines whether or not there are responses from the external device 18, to packets of PING commands transmitted from the encoder 14A to the external device 18, for the second specific number of consecutive times. When the determination of step 124 is negative, step 124 is repeated until the determination of step 124 is affirmative. During this time, the footage data is stored in the storage section 28 as footage data subject to protection.

Moreover, processing transitions to step 146 when the determination of step 124 is affirmative. At step 146, the overall controller 40 determines whether or not the connection point information has become information indicating that power is being supplied from the commercial power source 94. The processing of step 146 is repeated until the determination of step 146 is affirmative when the determination of step 146 is negative. During this time, the footage data is stored in the storage section 28 as footage data subject to protection Moreover, when the connection point information is information indicating that power is being supplied from the commercial power source 94, the determination at step 146 is affirmative, the overall controller 40 makes a request to the processor 42 to end footage data subject to protection and transitions to step 126. At step 126, when there has been a request from the overall controller 40 to end protection of footage data, the processor 42 sets the footage data protection end time in the settings value saving section 48, and makes a request to the settings value reflection section 44 for information reflection. Storage of the footage data subject to protection thereby ends.

Thus, in the fourth exemplary embodiment, in cases in which the connection point information has changed to information indicating that power is being supplied from the uninterruptible power source 92, a point in time reached by backtracking by a set time is set as a third start time at which to start protection of footage data. Moreover, in cases in which there is no response from the external device 18, to packets of PING commands, for the first specific number of consecutive times, a point in time reached by backtracking by the set time 80 is set as the first start time at which to start protection of footage data. The earliest time, from out of the third start time and the first start time, is then set as the point in time at which to start protection of footage data. Thus footage data of around the time the disaster or the like occurred can be reliably protected in cases in which the power source supplied the encoder 14C is switched from the commercial power source 94 to the uninterruptible power source 92 due to the effect of a disaster or the like earlier than communications with the external device 18 are cut off.

Moreover, in the fourth exemplary embodiment, the footage data is excluded from being subject to protection when responses from the external device 18 to packets of PING commands, have been detected for the second specific number of consecutive times, and the connection point information has changed to information indicating that power is being supplied from the commercial power source 94. Thus, even when recovering from the cutoff of communications with the external device 18, the protection of footage data continues while the state is such that power is supplied to the encoder 14C from the uninterruptible power source 92. Accordingly, footage data can be reliably protected during periods of emergency when power is supplied to the encoder 14C from the uninterruptible power source 92.

Fifth Exemplary Embodiment

Next, explanation follows regarding a fifth exemplary embodiment of technology disclosed herein. Portions similar to those of the first exemplary embodiment are allocated the same reference numerals, and explanation thereof is omitted.

Figure 14:
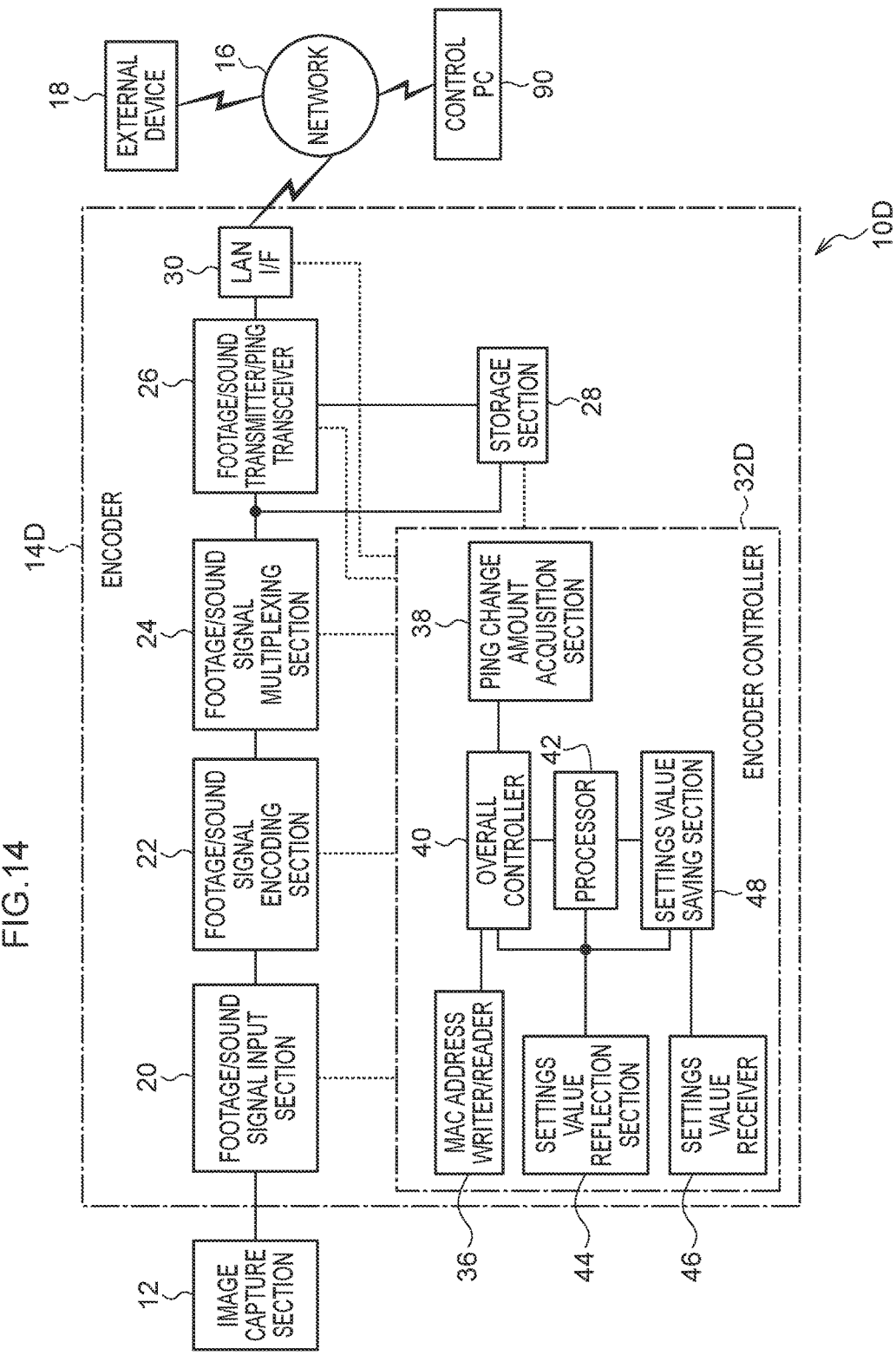
FIG. 14 is a block diagram illustrating an example of a schematic configuration of a footage collecting/broadcasting system according to a fifth exemplary embodiment.

A footage collecting/broadcasting system 10D according to the fifth exemplary embodiment is illustrated in FIG. 14. The footage collecting/broadcasting system 10D includes an encoder 14D. The encoder 14D differs from the encoder 14A explained in the first exemplary embodiment in that a MAC address writer/reader 36 is provided to an encoder controller 32D.

The MAC address writer/reader 36 writes the MAC address of the encoder 14D to the memory card (storage section) 28 when the memory card (storage section) 28 installed in the encoder 14D main body is initialized. The MAC address writer/reader 36 reads the MAC address of an encoder 14 written to the memory card (storage section) 28, and notifies the MAC address to the overall controller 40. The MAC address is an example of identification information of technology disclosed herein. Other than, for example, the MAC address, for example, information such as a serial number of the encoder 14D may be employed as the identification information.

Moreover, in the fifth exemplary embodiment, the encoder control program 64 further includes a MAC address writing/reading process 70 as indicated by the dotted line in so FIG. 2. In the fifth exemplary embodiment, the CPU 54 operates as the MAC address writer/reader 36 illustrated in FIG. 14 by executing the MAC address writing/reading process 70.

Next, explanation follows regarding footage protection processing according to the fifth exemplary embodiment, with reference to FIG. 15. In the footage protection processing according to the fifth exemplary embodiment, at step 150, the MAC address read from the memory card (storage section) 28 by the MAC address writer/reader 36 is acquired, and determination is made as to whether or not the acquired MAC address matches the MAC address of the device itself. When the determination of step 150 is affirmative, it can be determined that the memory card (storage section) 28 installed in the encoder 14D itself is a memory card (storage section) 28 that was initialized in the encoder 14D itself, and processing therefore transitions to step 120, and the processing of step 120 and onwards is performed.

However, when the determination of step 150 is negative, it can be determined that the memory card (storage section) 28 installed to the encoder 14D itself is a memory card (storage section) 28 initialized by another encoder 14. Examples of cases in which the memory card (storage section) 28 initialized by another encoder 14 is installed to the encoder 14D itself include cases in which the other encoder 14 has broken down.

When the determination of step 150 is negative, it is possible that the footage data written by another encoder 14 is stored to the memory card (storage section) 28, and there is a concern that the original footage data would be overwritten if new footage data was written to the memory card (storage section) 28. Therefore, when negative determination is made at step 150, processing transitions to step 152, writing of footage data to the memory card (storage section) 28 is ended, and the footage protection processing ends.

Thus, in the fifth exemplary embodiment, writing of footage data to the memory card (storage section) 28 is ended in cases in which the MAC address read from the memory card (storage section) 28 does not match the MAC address of the encoder 14D itself. Accordingly, overwriting of footage data written to the installed memory card (storage section) 28 can be prevented in cases in which the memory card (storage section) 28 installed in the encoder 14D was initialized by another encoder 14, due to, for example, a breakdown of the other encoder 14.

Although explanation has been given above regarding modes in which the encoder control program 64 is pre-stored (installed) to the storage section 58 as an example of a program according to technology disclosed herein, there is no limitation thereto. The program according to technology disclosed herein may be provided in a mode recorded on a non-transitory recording medium such as a CD-ROM or a DVD-ROM.

When footage is saved during an emergency such as when an earthquake occurs, a realistic approach is to store footage in the storage section by cyclically overwriting and storing, since there is a limit to the storage capacity of the storage section that stores the footage. Regarding this aspect, the first technology and the second technology make no mention of the nature of the timing to end footage storage that was started by detection of vibrations or the like. Thus in these technologies, when vibrations or the like are detected, and storage of footage to a storage section is initiated, whichever storage section footage is being stored to may reach a full state, and further attempts to store footage to the storage section may overwrite, and thus erase, a portion of the footage during an emergency.

Although the third technology describes detection of faults in a machine subject to monitoring by transmitting packets of a PING command, there is no mention of processing performed when there has been restoration from the fault. The third technology also makes no mention of saving footage.

Although the fourth technology describes suspending overwriting footage in the internal recording medium of around the time breakage occurred when it has been determined that the monitoring controller is broken or malfunctioning, there is no mention of processing performed when the monitoring controller has been restored. The fourth technology does not perform recording that overwrites footage in the internal recording medium in cases in which the monitoring controller has been restored, such that another device (monitoring controller) is needed for recording footage.

All publications, patent applications and technical standards mentioned in the present specification are incorporated by reference in the present specification to the same extent as if the individual publication, patent application, or technical standard was specifically and individually indicated to be incorporated by reference.

An aspect of technology disclosed herein enables effective utilization of a storage section while protecting needed footage.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A footage collecting/broadcasting device, comprising:
   a processor configured to execute a procedure, the procedure including:
      continuously, without stopping, and cyclically overwriting and storing sequentially input footage data in a region of a storage section that is outside of a region designated as a protected region;
      periodically transmitting an existence confirmation request to an external device, the external device including another processor;
      detecting an existence confirmation response from the external device;
      setting a point in time reached by backtracking by a set time as a first start time to start protection of the footage data by designating a region of the storage section, in which the footage data that is input since the first start time is stored, as the protected region and to which continuously, without stopping and cyclically overwriting of the input footage data is permitted, while simultaneously protecting the protected region from being overwritten, in cases in which the existence confirmation response from the external device is not detected a first specific number of times; and
      designating a region in which the footage data input after the existence confirmation response has been detected a second specific number of times as a non-protected region that is outside of the protected region, in cases in which the existence confirmation response from the external device has been detected the second specific number of times after the protection of the footage data has started.

2. The footage collecting/broadcasting device of claim 1, wherein writing of the footage data to the storage section is ended in cases in which a data amount of protected data stored in the storage section has reached a storage capacity of the storage section after the protection of the footage data has started.

3. The footage collecting/broadcasting device of claim 1, wherein:
   an amount of change in footage represented by the footage data is acquired in a memory; and
   when the acquired amount of change in the footage has exceeded a first threshold value, an earliest time, out of a second start time reached by backtracking by the set time and the first start time, is set as the point in time to start the protection of the footage data.

4. The footage collecting/broadcasting device of claim 3, wherein, in cases in which a state, in which the existence confirmation response has been detected the second specific number of times and the amount of change in the footage is equal to or less than a second threshold value smaller than the first threshold value, continues for a specific time after the protection of the footage data has started, the footage data input after the existence confirmation response has been detected the second specific number of times is excluded from being subject to protection.

5. The footage collecting/broadcasting device of claim 1, wherein:
connection point information is received indicating whether power is being supplied from a main power source or an auxiliary power source; and
in cases in which the received connection point information has changed to information indicating that the power is being supplied from the auxiliary power source, an earliest time, out of a third start time reached by backtracking by the set time and the first start time, is set as the point in time to start the protection of the footage data.

6. The footage collecting/broadcasting device of claim 5, wherein, after the protection of the footage data has started, in cases in which the existence confirmation response has been detected the second specific number of times and the connection point information is information indicating that the power is being supplied from the main power source, the input footage data is excluded from being subject to the protection.

7. The footage collecting/broadcasting device of claim 1, wherein:
identification information of the device is written to the storage section when the storage section is initialized;
the identification information stored in the storage section is read; and
writing of the footage data to the storage section is performed in cases in which the read identification information matches the identification information of the device.

8. A footage collecting/broadcasting system comprising:
an imaging device including a camera and a microphone that outputs footage data;
the footage collecting/broadcasting device of claim 1; and
an external device that receives the footage data from the footage collecting/broadcasting device.

9. A footage collecting/broadcasting method comprising, by a processor;
continuously, without stopping, and cyclically overwriting and storing sequentially input footage data in a region of a storage section that is outside of a region designated as a protected region;
periodically transmitting an existence confirmation request to an external device, the external device including another processor;
detecting an existence confirmation response from the external device;
setting a point in time reached by backtracking by a set time as a first start time to start protection of the footage data by designating a region of the storage section, in which the footage data that is input since the first start time is stored, as the protected region and to which continuously, without stopping and cyclically overwriting of the input footage data is permitted, while simultaneously protecting the protected region from being overwritten, in cases in which the existence confirmation response is not detected a first specific number of times; and
designating a region in which the footage data input after the existence confirmation response has been detected a second specific number of times as a non-protected region that is outside of the protected region, in cases in which the existence confirmation response from the external device has been detected the second specific number of times after the protection of the footage data has started.

10. The footage collecting/broadcasting method of claim 9, wherein writing of the footage data to the storage section is ended in cases in which a data amount of protected data stored in the storage section has reached a storage capacity of the storage section after the protection of the footage data has started.

11. The footage collecting/broadcasting method of claim 9, wherein:
an amount of change in footage represented by the footage data is acquired in a memory; and
when the acquired amount of change in the footage has exceeded a first threshold value, an earliest time, out of a second start time reached by backtracking by the set time or the first start time, is set as the point in time to start the protection of the footage data.

12. The footage collecting/broadcasting method of claim 11, wherein, in cases in which a state, in which the existence confirmation response has been detected the second specific number of times and the amount of change in the footage is equal to or less than a second threshold value smaller than the first threshold value, continues for a specific time after the protection of the footage data has started, the footage data input after the existence confirmation response has been detected the second specific number of times is excluded from being subject to the protection.

13. The footage collecting/broadcasting method of claim 9, wherein:
connection point information is received indicating whether power is being supplied from a main power source or an auxiliary power source; and
in cases in which the received connection point information has changed to information indicating that the power is being supplied from the auxiliary power source, an earliest time, out of a third start time reached by backtracking by the set time or the first start time, is set as the point in time to start the protection of the footage data.

14. The footage collecting/broadcasting method of claim 13, wherein, after the protection of the footage data has started, in cases in which the existence confirmation response has been detected the second specific number of times and the connection point information is information indicating that the power is being supplied from the main power source, the input footage data is excluded being subject to the protection.

15. The footage collecting/broadcasting method of claim 9, wherein:
identification information of the device is written to the storage section when the storage section is initialized;
the identification information stored in the storage section is read; and
writing of the footage data to the storage section is performed in cases in which the read identification information matches the identification information of the device.

16. A non-transitory recording medium storing a program executable by a computer to perform a process, the process comprising:
continuously, without stopping, and cyclically overwriting and storing sequentially input footage data in a region of a storage section that is outside of a region designated as a protected region;
periodically transmitting an existence confirmation request to an external device, the external device including another processor;
detecting an existence confirmation response from the external device;

setting a point in time reached by backtracking by a set time as a first start time to start protection of the footage data by designating a region of the storage section, in which the footage data that is input since the first start time is stored, as the protected region and to which continuously, without stopping and cyclically overwriting of the input footage data is permitted, while simultaneously protecting the protected region from being overwritten, in cases in which the existence confirmation response is not detected a first specific number of times; and designating a region in which the footage data input after the existence confirmation response has been detected a second specific number of times as a non-protected region that is outside of the protected region, in cases in which the existence confirmation response from the external device has been detected the second specific number of times after the protection of the footage data has started.

* * * * *